US012697828B2

(12) United States Patent
Takahashi

(10) Patent No.: US 12,697,828 B2
(45) Date of Patent: Aug. 4, 2026

(54) PRINTER

(71) Applicants: CITIZEN WATCH CO., LTD., Tokyo (JP); CITIZEN SYSTEMS JAPAN CO., LTD., Tokyo (JP)

(72) Inventor: Akira Takahashi, Nagano (JP)

(73) Assignees: CITIZEN WATCH CO., LTD., Tokyo (JP); CITIZEN SYSTEMS JAPAN CO., LTD., Tokyo (JP)

( * ) Notice: Subject to any disclaimer, the term of this patent is extended or adjusted under 35 U.S.C. 154(b) by 132 days.

(21) Appl. No.: 18/857,750

(22) PCT Filed: Feb. 28, 2023

(86) PCT No.: PCT/JP2023/007184
§ 371 (c)(1),
(2) Date: Oct. 17, 2024

(87) PCT Pub. No.: WO2023/210145
PCT Pub. Date: Nov. 2, 2023

(65) Prior Publication Data

US 2025/0269670 A1 Aug. 28, 2025

(30) Foreign Application Priority Data

Apr. 27, 2022 (JP) ................................. 2022-073471

(51) Int. Cl.
*B41J 13/00* (2006.01)
*B41J 3/60* (2006.01)
(Continued)

(52) U.S. Cl.
CPC ............... *B41J 13/009* (2013.01); *B41J 3/60* (2013.01); *B41J 11/0005* (2013.01); *B41J 11/70* (2013.01); *B41J 2/325* (2013.01)

(58) Field of Classification Search
CPC .. B41J 13/0009; B41J 13/0027; B41J 13/009; B41J 3/60; B41J 11/0005; B41J 11/70;
(Continued)

(56) References Cited

U.S. PATENT DOCUMENTS 6,128,463 A 10/2000 Matsumoto et al.
9,352,924 B2 * 5/2016 Hori ......................... B41J 29/02
(Continued)

FOREIGN PATENT DOCUMENTS

JP H10167543 A 6/1998
JP 2003326783 A 11/2003
(Continued)

OTHER PUBLICATIONS

International Search Report from corresponding International Application No. PCT/JP2023/007184, Apr. 25, 2023, 4 pages with translation.
Extended European Search Report from corresponding European Application No. 23795893.9 mailed on Apr. 15, 2026, 9 pages.

*Primary Examiner* — Stephen D Meier
*Assistant Examiner* — Thomas Ray Knief
(74) *Attorney, Agent, or Firm* — Tucker Ellis LLP

(57) ABSTRACT

A printer includes a first flap that switches a path for a paper transported in a transport direction, to one of first and second paths; a second flap provided downstream of the first flap in the transport direction and configured to switch the path for the paper transported through the second path, to one of third and fourth paths; a movable member that moves in a paper width direction orthogonal to the transport direction; and a switching mechanism that switches the first flap between a state where the movable member is disposed at a first position in the width direction and a state where the movable member is disposed at another position and switches the second flap between a state where the movable member is disposed at a second position in the width direction and a
(Continued)

state where the movable member is disposed at another position.

7 Claims, 16 Drawing Sheets

(51) Int. Cl.
*B41J 11/00* (2006.01)
*B41J 11/70* (2006.01)
*B41J 2/325* (2006.01)

(58) Field of Classification Search
CPC ..... B41J 11/706; B41J 2/325; B65H 2404/64; B65H 2404/67; B65H 5/36
See application file for complete search history.

(56) References Cited

U.S. PATENT DOCUMENTS

| | | | | |
|---|---|---|---|---|
| 2017/0279993 | A1 | 9/2017 | Kakuta | |
| 2019/0030925 | A1 | 1/2019 | Takahashi et al. | |
| 2019/0329572 | A1* | 10/2019 | Kodama | B65H 43/00 |
| 2020/0324561 | A1 | 10/2020 | Takahashi | |
| 2021/0309023 | A1 | 10/2021 | Kimata | |

FOREIGN PATENT DOCUMENTS

| | | | |
|---|---|---|---|
| JP | 2015189204 | A | 11/2015 |
| JP | 2017177581 | A | 10/2017 |
| JP | 2017183771 | A | 10/2017 |

* cited by examiner

PRINTER

CROSS-REFERENCE TO RELATED APPLICATION

The present application is based upon and claims priority to Japanese Patent Application No. 2022-073471, filed Apr. 27, 2022, the entire disclosure of which is incorporated in its entirety in the present specification by reference.

TECHNICAL FIELD

The present disclosure relates to a printer.

BACKGROUND

A printer is required to switch paper transport paths within the printer when printing or discharging paper. At a point where the paper transport paths are switched, it is necessary to have a flap that switches the transport paths and a drive mechanism that drives and moves the flap by a command from a controller (e.g., Patent Literature 1: JP 2021-160899A, Patent Literature 2: JP 2015-189204A, etc.).

SUMMARY

Adding a flap and its corresponding drive mechanism at each point where the paper transport paths are switched increases the number of components, thereby also increasing the production cost.

An object of the present disclosure is to provide a printer that moves flaps by a drive mechanism whose number is less than that of the flaps, thereby reducing the number of components for driving the flaps.

To achieve the object, a printer includes a first flap that is configured to switch a path for a paper transported in a transport direction, to one of a first path and a second path; a second flap that is provided downstream of the first flap in the transport direction and configured to switch the path for the paper transported through the first path, to one of a third path and a fourth path; a movable member that is configured to move in a width direction of the paper, the width direction being orthogonal to the transport direction; and a switching mechanism that is configured to switch the first flap between a state in which the movable member is disposed at a first position in the width direction and a state in which the movable member is disposed at a position other than the first position in the width direction, and to switch the second flap between a state in which the movable member is disposed at a second position in the width direction and a state in which the movable member is disposed at a position other than the second position in the width direction.

DETAILED DESCRIPTION

In the following, embodiments of the printer according to the present disclosure is described with reference to the drawings.

Figure 1:
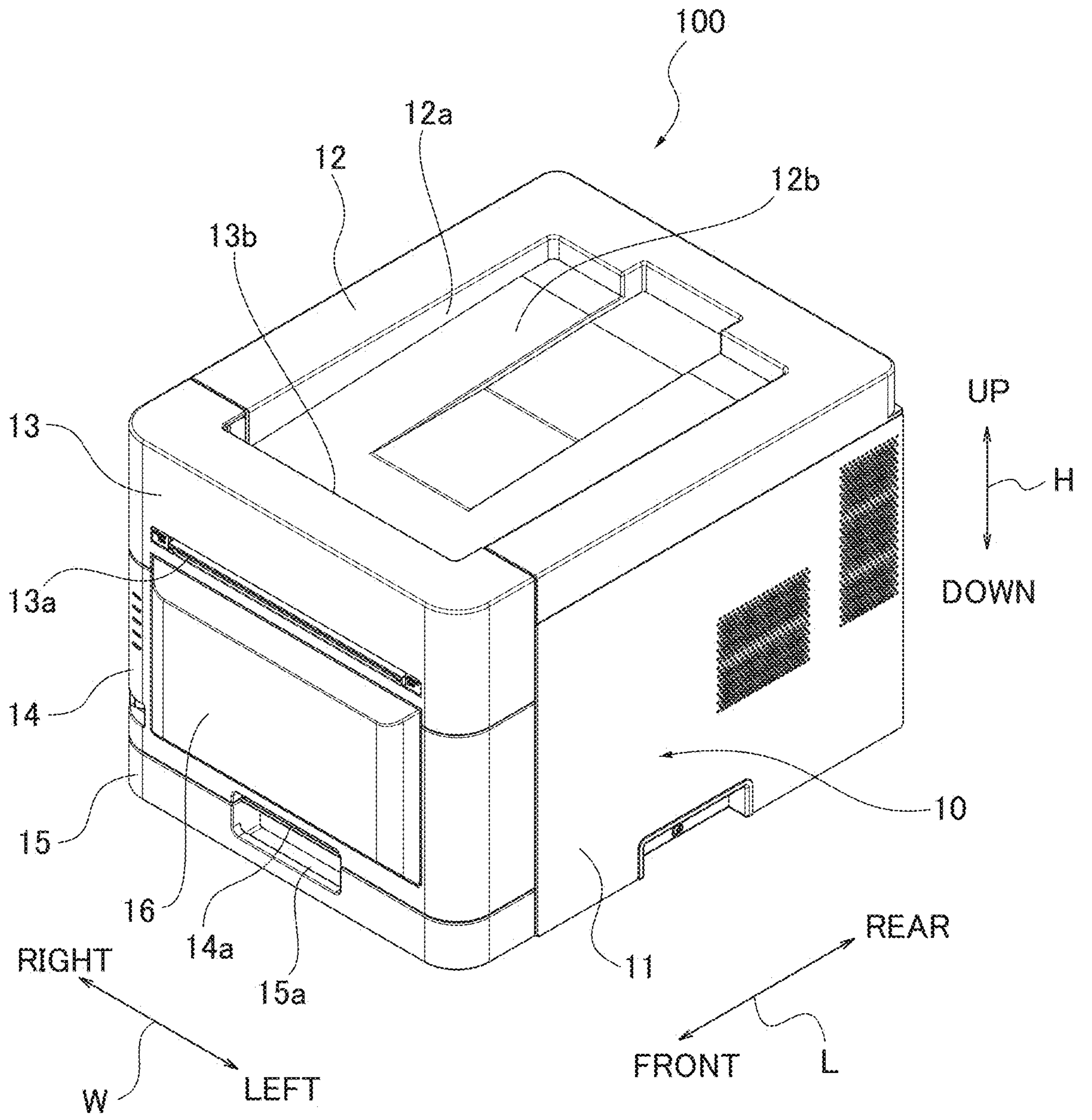
FIG. 1 is a perspective view showing an external appearance of a dye-sublimation thermal printer (hereinafter referred to as printer).
Figure 2:
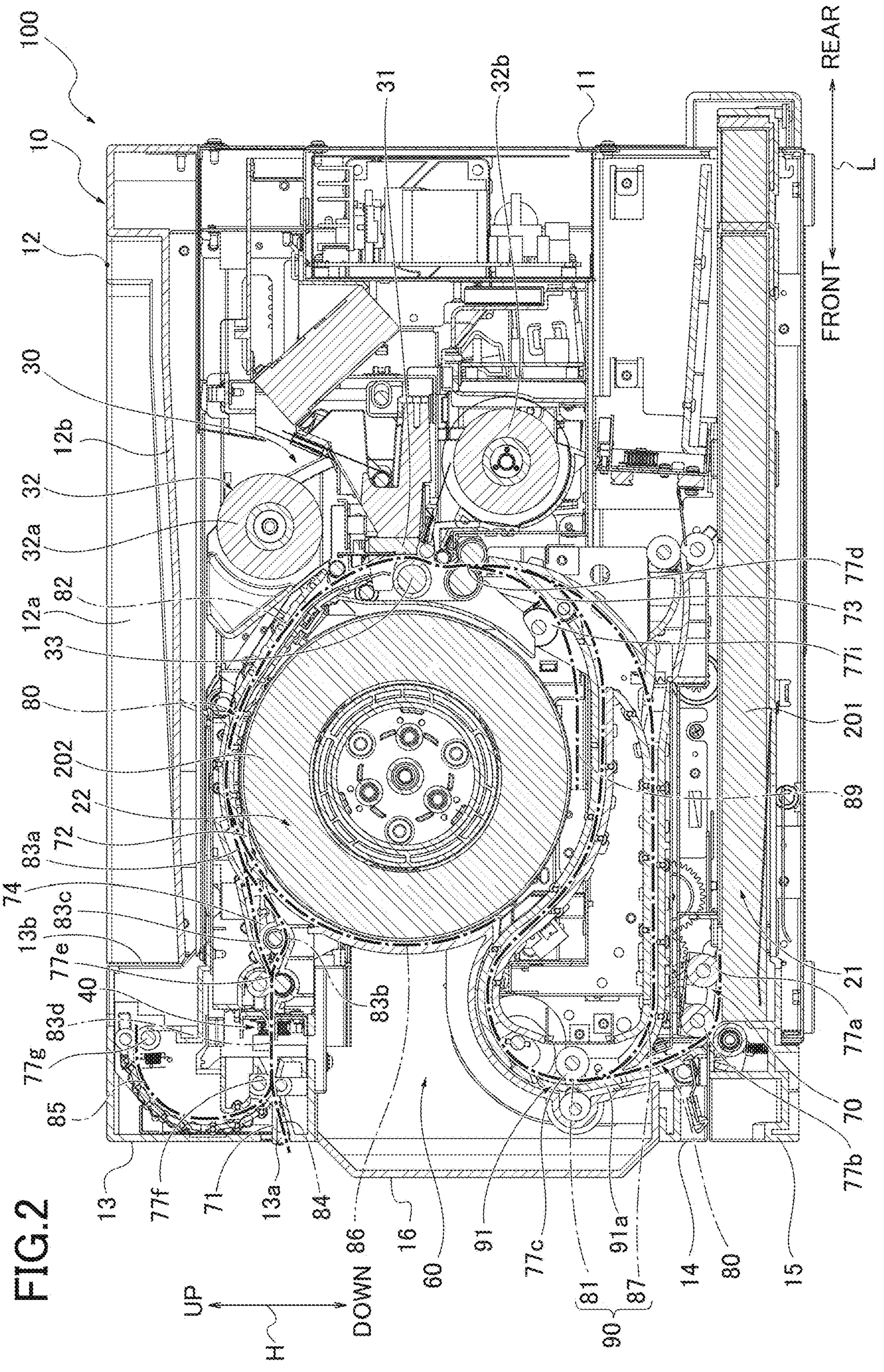
FIG. 2 is a cross-sectional view taken by a vertical plane passing the center in the width direction W of the printer along a front-rear direction L.
Figure 3:
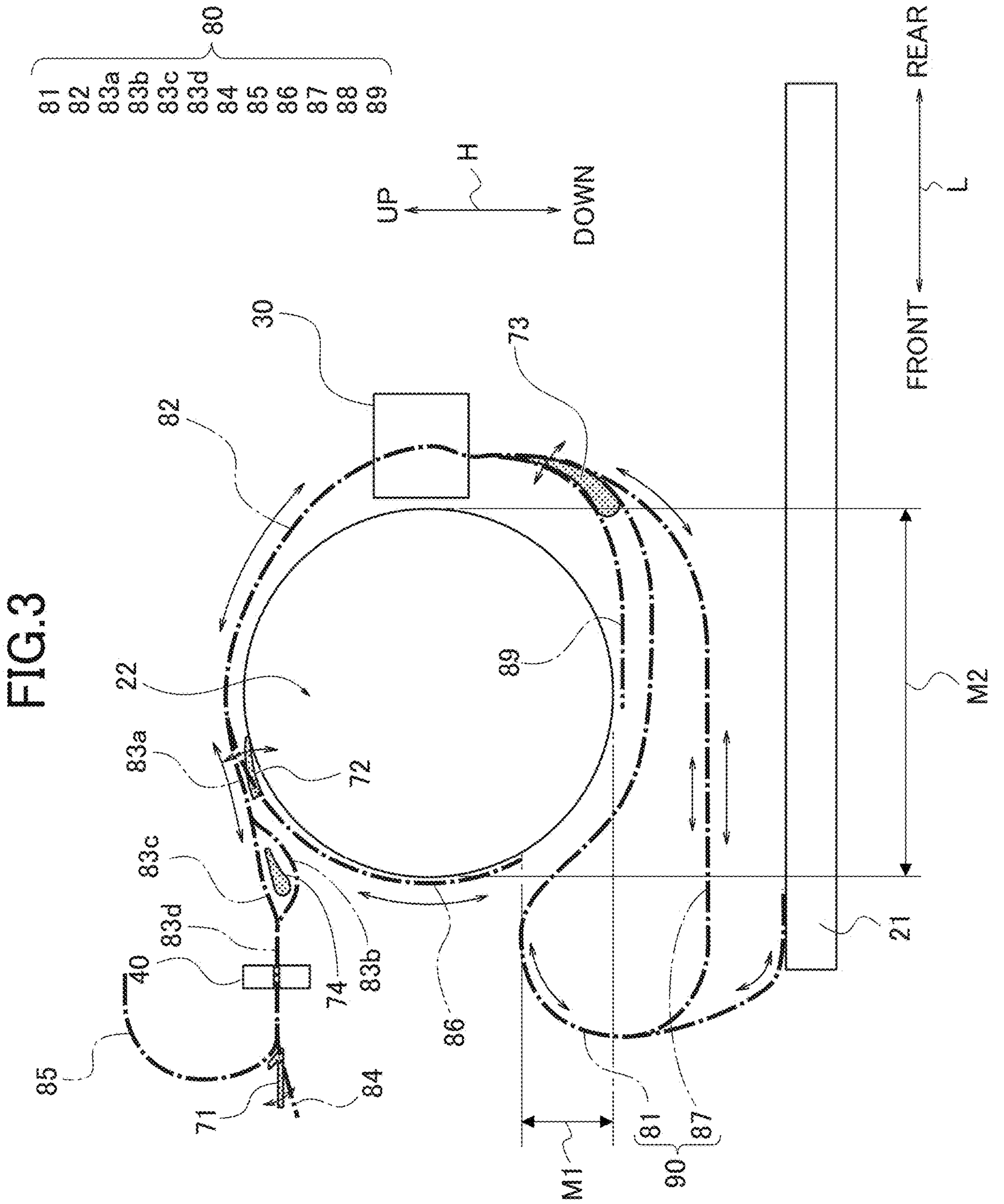
FIG. 3 is a schematic view schematically showing a transport path by simplifying FIG. 2, for clarifying the transport path shown in FIG. 2.

(Configuration) FIG. 1 is a perspective view showing an external appearance of a dye-sublimation thermal printer 100 (hereinafter, referred to as printer 100). FIG. 2 is a cross-sectional view taken by a vertical plane passing the center in the width direction W of the printer 100 along a front-rear direction L. FIG. 3 is a schematic view that is schematically shown by simplifying FIG. 2 for clarifying the transport path 80 shown in FIG. 2.

Figure 4:
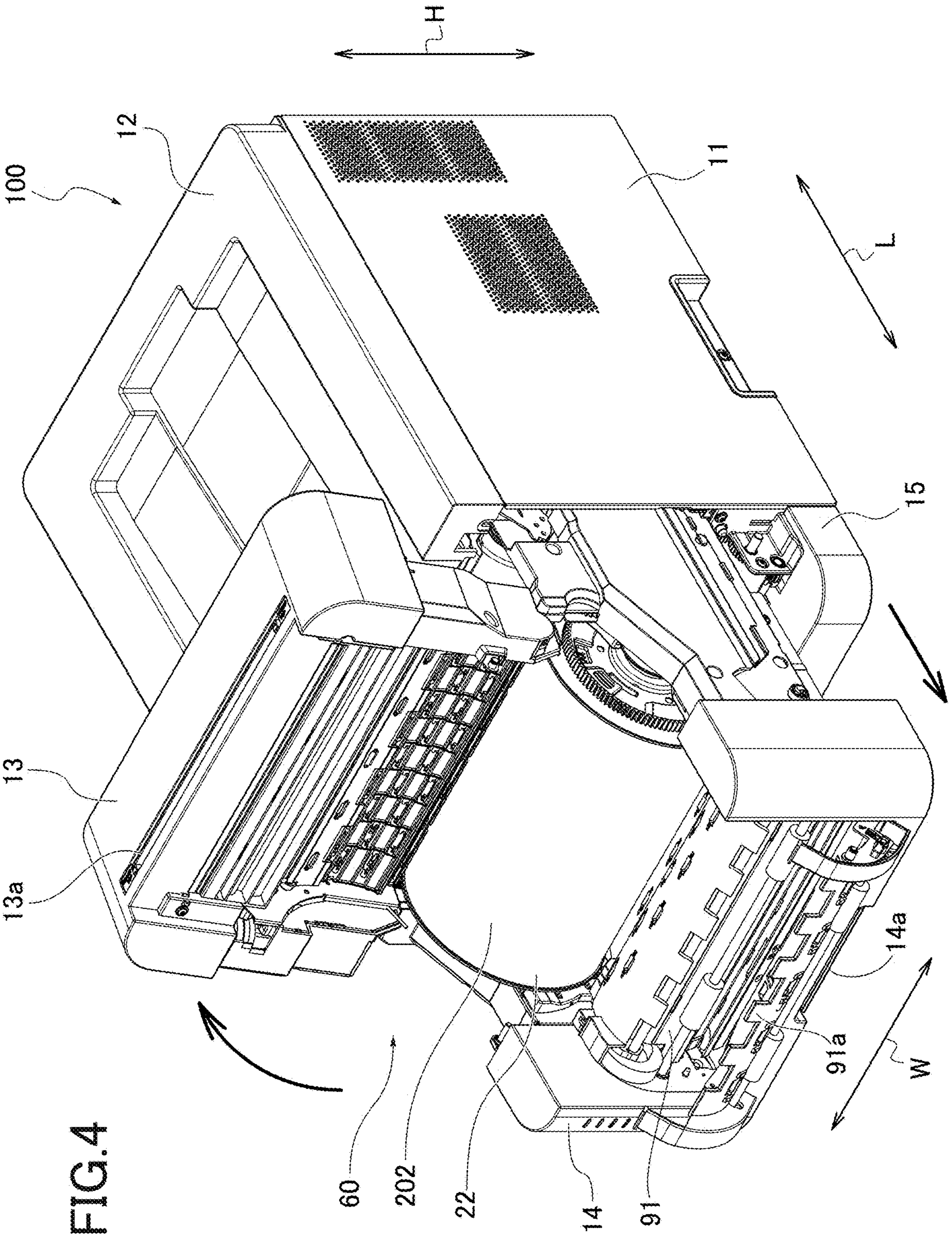
FIG. 4 is a perspective view showing the printer with a front upper cover open and a roll paper storage pulled forward in the front-rear direction L.
Figure 5:
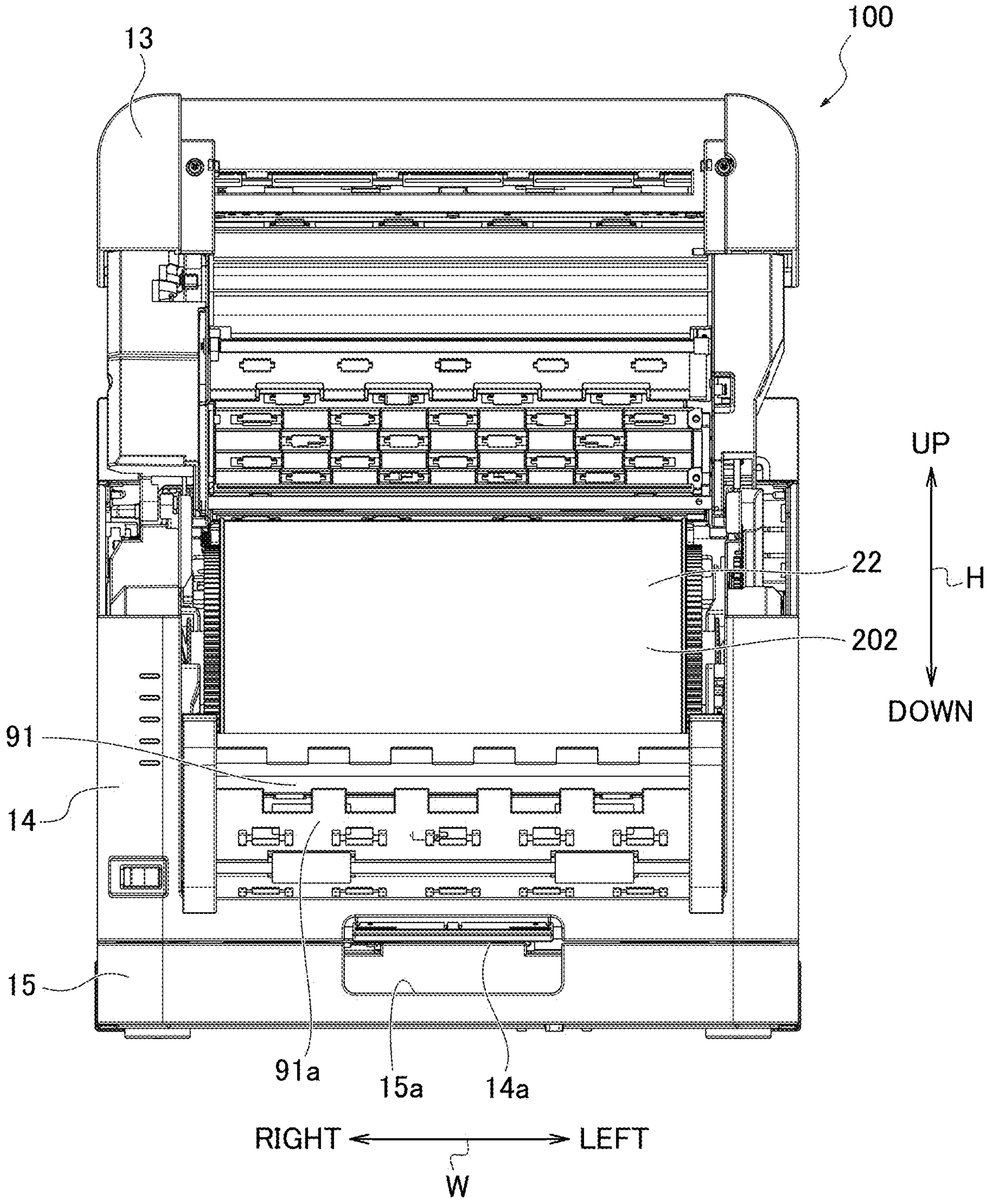
FIG. 5 is a front view of the printer in the condition of FIG. 4 seen from the front.
Figure 6:
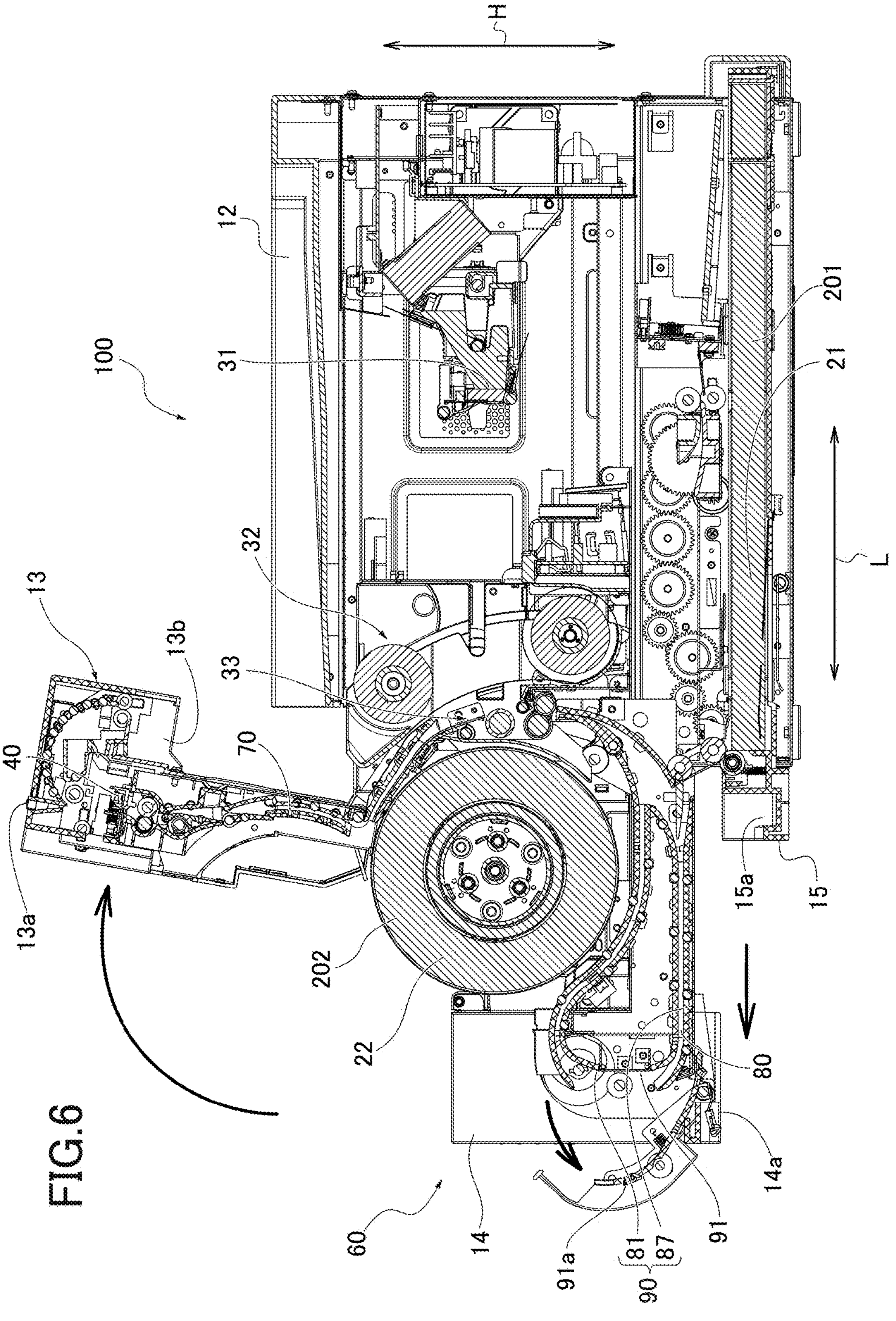
FIG. 6 is a sectional view of the printer in the condition of FIG. 4, corresponding to FIG. 2.

FIG. 4 is a perspective view showing the printer with a front top cover 13 of the printer 100 open and a roll paper storage 22 pulled forward in the front-rear direction L. FIG. 5 is a front view of the printer in the condition of FIG. 4 seen from the front. FIG. 6 is a sectional view of the printer in the condition of FIG. 4, which is corresponding to FIG. 2.

The printer shown in the drawings is the printer in one embodiment of the present disclosure. The printer 100 includes a case 10, a sheet paper storage 21, a roll paper storage 22, a printing portion 30, a cutter 40, a transport portion 70, and a transport path 80.

A top cover 12 is disposed to close a top opening in a height direction H of a case body 11. The top cover 12 is formed with a recess at the front-end portion and the inner portion 12*a*, excluding both side edges and the rear edge of the outer periphery to function as a stacker to receive a sheet paper 201 (hereinafter, also simply referred to as paper 201) or an unwound paper 203 from a roll paper 202 (hereinafter, also simply referred to as paper 203) is stored.

As shown in FIG. 2, a bottom surface 12*b* of the recessed portion 12*a* of the top cover 12 is inclined so that the front side is lower than the rear side. Due to the inclination of the bottom surface 12*b*, the paper 201, 203 discharged rearward from an upper outlet 13*b* of the front top cover 13, which is described later, is stacked on the front side of the bottom surface 12*b* of the recessed portion 12*a*.

The front top cover 13 is disposed at the top of the front surface of the printer 100. A front bottom cover 15 is disposed at the bottom of the front surface of the printer 100. A front center cover 14 is disposed between the front top cover 13 and the front bottom cover 15 on the front surface of the printer 100.

(Internal Drawer Unit) As shown in FIGS. 4 and 6, the front top cover 13 and the front center cover 14 are provided in an internal drawer 60 (one example of a drawer unit). The internal drawer 60 is arranged within the inner part of the printer enclosed by the case body 11 and the top cover 12. The internal drawer 60 can be pulled forward relative to the case body 11 and the top cover 12 by pulling it forward in the front-rear direction L with a user's finger placed on a fingerhold 14*a* formed at the bottom of the front center cover 14.

In addition to the front top cover 13 and the front center cover 14, the internal drawer 60 includes the roll paper storage 22, the cutter 40, the transport portion 70, and the transport path 80.

The front top cover 13 is supported to be rotatable in the upper rearward direction shown with the arrow in FIGS. 4 and 6, in a condition that the internal drawer 60 has been drawn forward from the inner part enclosed by the case body 11 and the top cover 12 as shown in FIGS. 4 and 6, from a condition that the front top cover 13 is closed as shown in FIG. 1. When the front top cover 13 is opened by the upper rearward rotation, the front and the top of the roll paper storage 22 are partially exposed. This exposes the roll paper storage 22 formed within the case 10, thereby enabling the roll paper 202 to be inserted into or removed from the roll paper storage 22.

The front top cover 13 includes a front outlet 13*a* on the front surface. The front outlet 13*a* is configured to discharge the printed paper 201, 203 forward. The front top cover 13 further includes an upper outlet 13*b* on the rear surface. The upper outlet 13*b* is configured to discharge the printed paper 201, 203 into the stacker. The stacker is formed on the top cover 12 and located at the rear of the upper outlet 13*b*.

FIGS. 4, 5, and 6 show the printer 100 with a trash box 16 (see FIGS. 1 and 2) removed from the front center cover 14. The trash box 16 is attached to the front center cover 14 and positioned below the cutter 40, which is described later. The trash box 16 is a member to receive cut-off pieces generated when the cutter 40 cuts the paper 201, 203. The trash box 16 is attached to the front center cover 14 and can be removed by sliding it upward relative to the front center cover 14.

Therefore, the trash box 16 cannot be removed from the front center cover 14 when the front top cover 13 is closed, but can be removed from the front center cover 14 when the front top cover 13 is opened. The cut-off pieces and/or other waste within the trash box 16 can be disposed of when the trash box 16 is removed from the front center cover 14.

As shown in FIGS. 2 and 6, the front bottom cover 15 is formed on the front side of the sheet paper storage 21, which is shaped like a tray (the front bottom cover 15 is a part of the sheet paper storage 21).

(Sheet paper storage) As shown in FIG. 2, the sheet paper storage 21 is provided at the bottom of the printer 100 and below the roll paper storage 22. The sheet paper storage 21 stores a plurality of sheet paper 201 that has been cut into a predetermined size and stacked up in the thickness direction.

The sheet paper storage 21 can be pulled or drawn forward relative to the case body 11 and the top cover 12 independently of the internal drawer 60, by pulling the sheet paper storage 21 forward in the front-rear direction L with a user's fingers placed on a fingerhold 15*a* formed on an upper part of the front bottom cover 15. The sheet paper storage 21 is opened at its top when it is drawn forward relative to the case body 11 and the top cover 12, which allows the sheet paper 201 to be inserted into or removed from the sheet paper storage 21 through the open top.

(Roll paper storage) As mentioned above, the roll paper storage 22 is formed in the internal drawer 60. The roll paper storage 22 is configured to store the roll paper 202 prepared by rolling the elongated paper 203. As shown in FIGS. 2, and 4 to 6, the roll paper storage 22 holds the roll paper 202 in an orientation where the axis of the roll paper 202 is parallel to the width direction W of the printer 100.

The roll paper storage 22 is located above the sheet paper storage 21 when the internal drawer 60 is stored within the case 10 as shown in FIG. 2. In FIG. 2, the roll paper 202 is positioned to rotate in a counterclockwise direction when the paper 203 is drawn and unwound from the lower end of the roll paper 202 toward the right in the drawing.

(Printing Portion) The printing portion 30 is disposed on the rear side of the roll paper storage 22. Under the control of a controller (not illustrated) of the printer 100, the printing portion 30 is configured to perform printing on the paper 201, 203 passing through a portion (a printing path 82 described below) of the transport path 80 rising substantially in the vertical direction on the rear side the roll paper storage 22.

The printing portion 30 includes a thermal head 31, the ink ribbon 32, and the platen roller 33. A sublimation dye is applied to a ribbon of the ink ribbon 32. The ink ribbon 32 is fed from a feeding side roll 32*a* to a winding side roll 32*b* in synchronization with the transport of the paper 201, 203 and the sublimation dye of the ink ribbon 32 is diffusively transferred to the paper 201, 203 with heat from the thermal head 31 contacting the ink ribbon 32. Thereby, the printing is performed on the paper 201, 203.

The ink ribbon 32 is provided in the internal drawer 60. As shown in FIGS. 4 and 6, the ink ribbon 32 can be drawn forward passing through a region above the roll paper storage 22 in an arc shape when the internal drawer 60 is drawn to the front side from the case body 11 and the front top cover 13 is not rotated to the upper rear side.

As a result, the ink ribbon 32 can be removed upward from the open upper side of the internal drawer 60 between the top cover 12 and the front top cover 13, which facilitates the replacement of the ink ribbon 32.

The platen roller 33 is disposed on the opposite side of the ink ribbon 32 and the thermal head 31 with the paper 201, 203 interposed therebetween. The platen roller 33 is configured to press the paper 201, 203 against the ink ribbon 32.

(Cutter) The cutter 40 is disposed in the front top cover 13 on the front side of the roll paper storage 22. Under the control of the controller (not illustrated) of the printer 100, the cutter 40 cuts, along the width direction W, the paper

201, 203 passing through a portion (a joined path 83*d* described below) of the transport path 80 extending forward from the upper side of the roll paper storage 22. Cut pieces of the paper 201 fall into and are stored in the trash box 16 disposed below the cutter 40.

Figure 7:
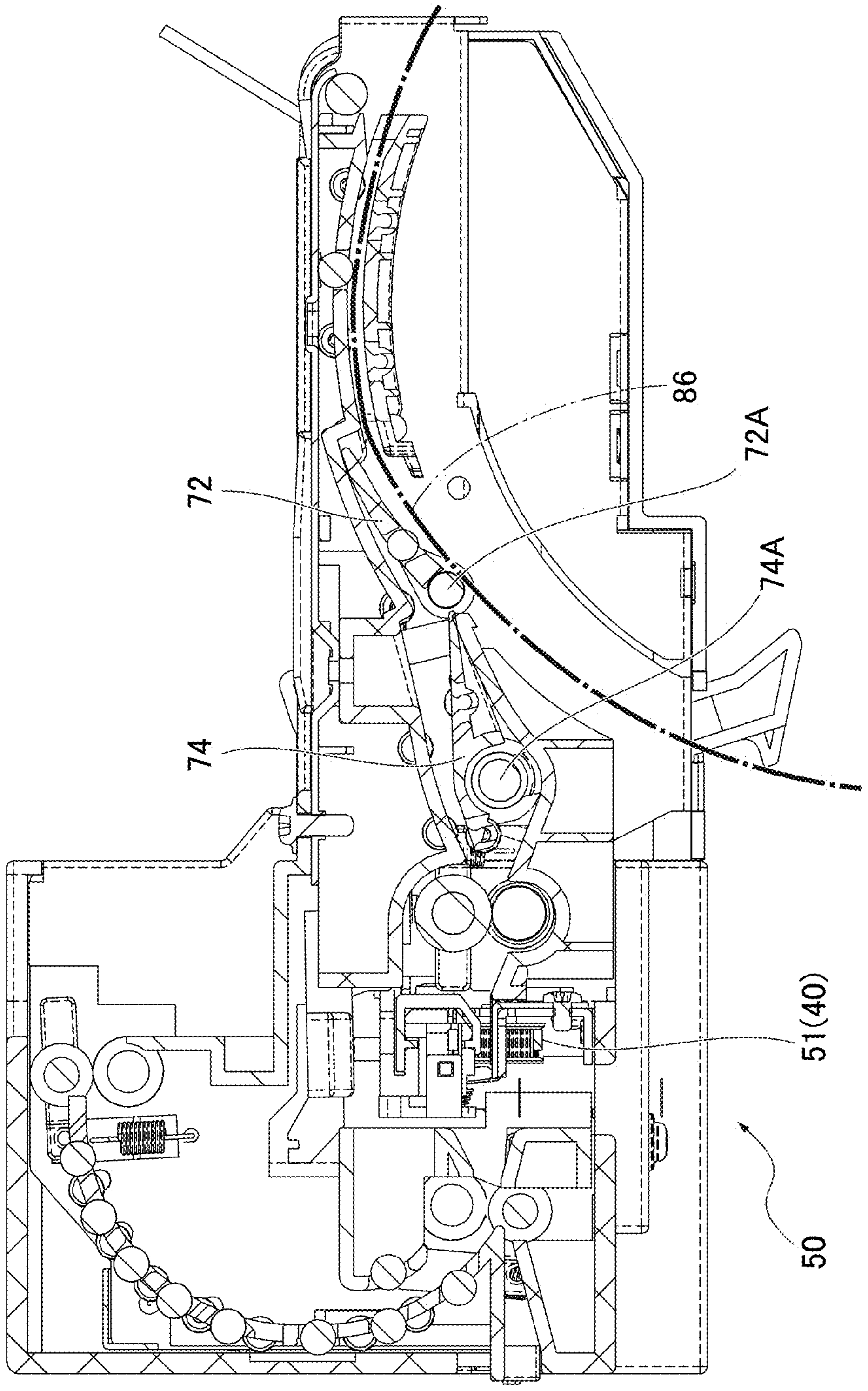
FIG. 7 is an enlarged sectional view showing a part of FIG. 2 without the roll paper storage.
Figure 8:
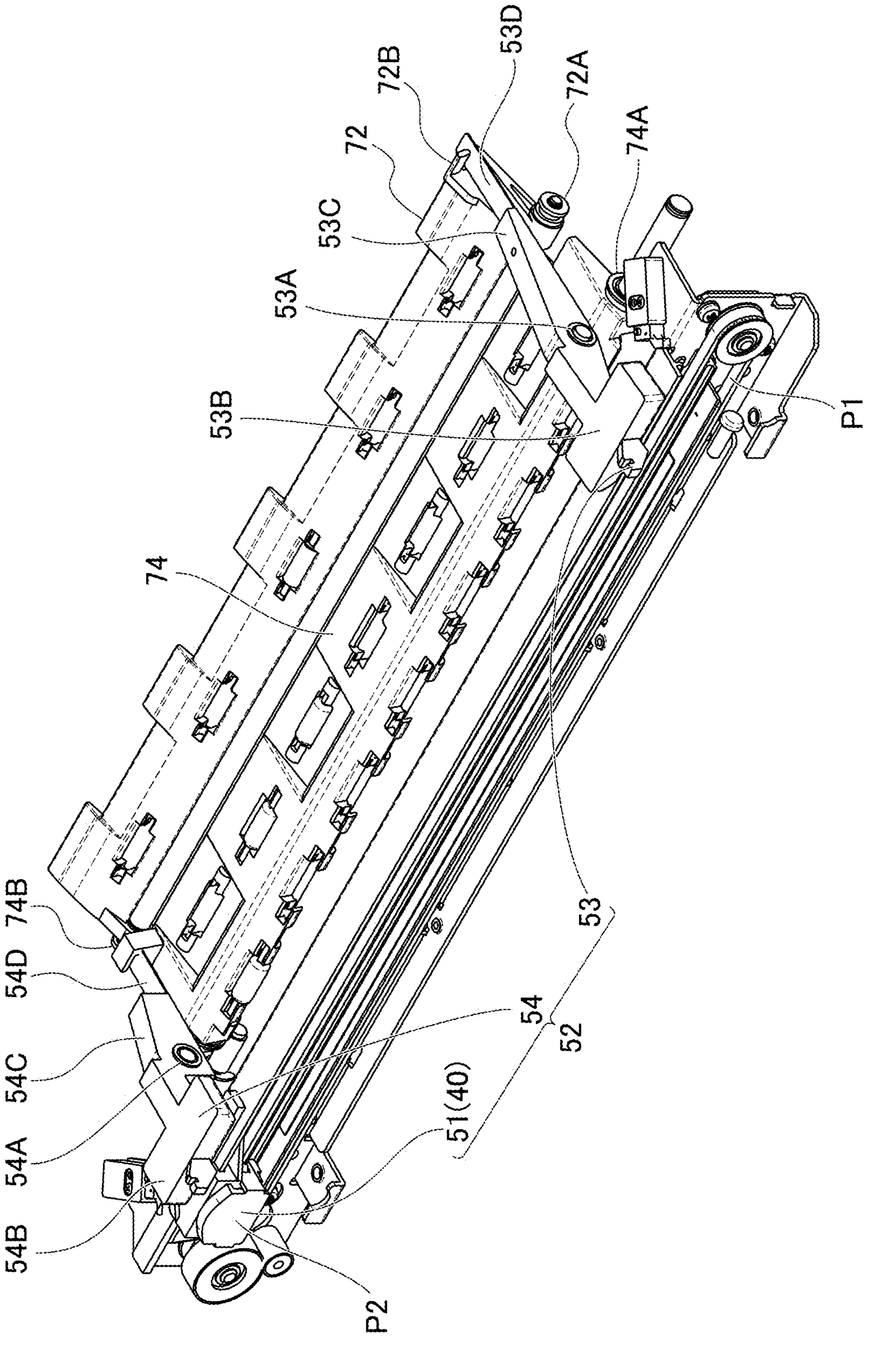
FIG. 8 is a perspective view showing members that constitute a transport-path switching mechanism without other members.
Figure 9:
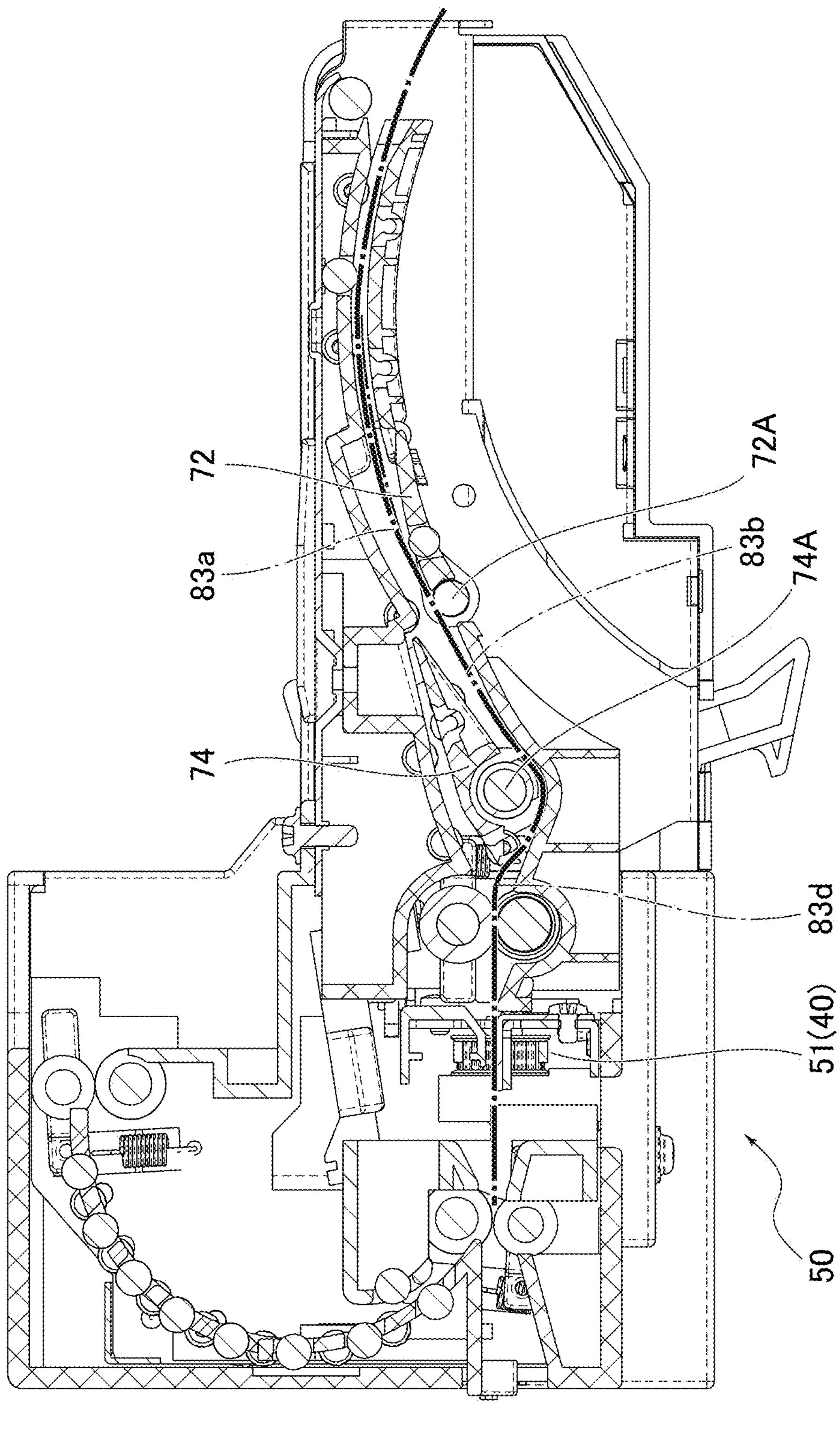
FIG. 9 is an enlarged sectional view showing a part of FIG. 2 without the roll paper storage.
Figure 10:
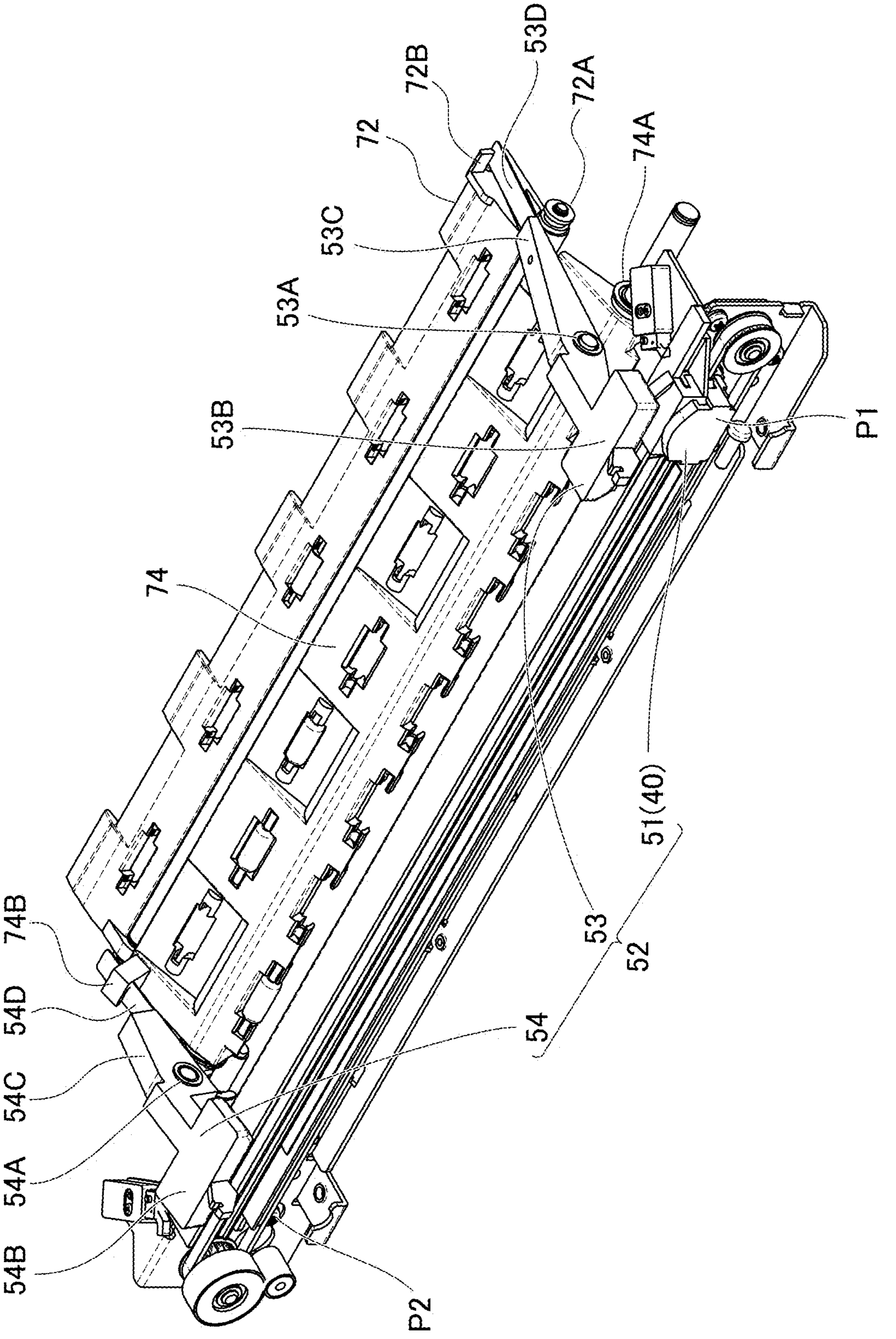
FIG. 10 is a perspective view showing members that constitute a transport-path switching mechanism without other members.
Figure 11:
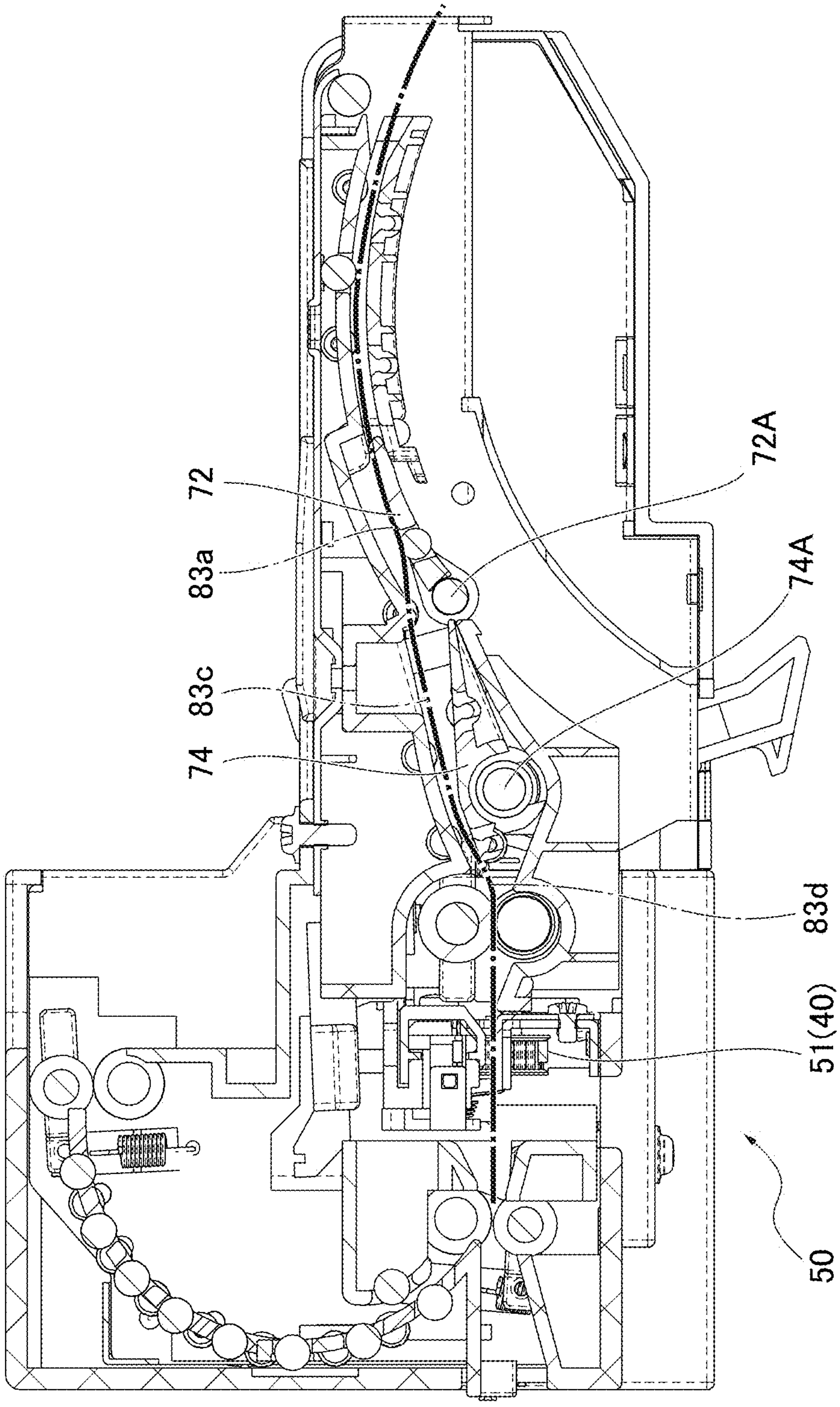
FIG. 11 is an enlarged sectional view showing a part of FIG. 2 without the roll paper storage.

(Transport-path Switching Mechanism) FIGS. 7 to 11 are views for clarifying the transport-path switching mechanism that switches between the printing on the paper and the discharge of the paper and is covered with the front top cover 13. FIGS. 7, 9, and 11 are enlarged sectional views showing a part of FIG. 2 without the roll paper storage. FIGS. 8 and 10 are perspective views showing members that constitute the transport-path switching mechanism without other members for describing the operation of the transport-path switching mechanism.

The transport-path switching mechanism 50 includes a first flap (printing discharge switching flap) 72, a second flap (de-curling switching flap) 74, a movable member 51, and a switching mechanism 52.

The first flap (printing discharge switching flap) 72 is configured to switch the path of the paper 201, 203 to one of the first and second paths. Specifically, in the present embodiment, the first path is a printing path (printing upstream path 86 described later) selected for printing on the paper 201, 203, and the second path is a traveling path (discharge path 83*a* described later) selected for moving the paper 201, 203 toward the outlet. The first flap 72 is configured to rotate about a rotation shaft 72A over a predetermined angular range. The first flap 72 includes a connecting portion 72B relating to the first link 53, which is described later, at one of the ends.

The second flap (de-curling switching flap) 74 is provided downstream of the first flap (printing discharge switching flap) 72 in the transport direction to switch the path of the paper 201, 203, which has been transported through the second path (discharge path 83*a*), to one of the third and fourth paths. Specifically, in the present embodiment, the third path is a de-curling treatment discharge path 83*b* that is configured to discharge the paper after a de-curling treatment to correct the curl of the paper (particularly paper 203). The fourth path is a discharge path 83*c* that is configured to make the paper 201, 203, which has passed through the second path (discharge path 83*a*), travel directly toward the outlet. The de-curling treatment discharge path 83*b* and the discharge path 83*c* join together on a downstream side to form the joined path 83*d*. The second flap 74 is configured to rotate about a rotation shaft 74A over a predetermined angular range. The second flap 74 includes, at one of the ends, a connecting portion 74B relating to the second link 54 which is described later.

The movable member 51 is configured to move in the width direction W of the paper 201, 203, which is orthogonal to the transport direction. In the present embodiment, the cutter 40 also functions as the movable member 51.

The switching mechanism 52 switches the first flap 72 between a state in which the movable member 51 is disposed at a first position P1 and a state in which the movable member 51 is disposed at a position other than the first position P1. The switching mechanism 52 also switches the second flap 74 between a state in which the movable member is disposed at a second position P2 and a state in which the movable member 51 is disposed at a position other than the second position P2. In the present embodiment, specifically, the switching mechanism 52 includes the first link 53 and the second link 54. The first link 53 is configured to switch the first flap 72 between a state in which the movable member 51 is disposed at a first one (first position) P1 in the width direction W and a state in which the movable member 51 is disposed at a position other than the first end. The second link 54 is configured to switch the second flap 74 between a state in which the movable member 51 is disposed at a second end (second position) P2 in the width direction W and a state in which the movable member 51 is disposed at a position other than the second end.

The first link 53 includes a rotation shaft portion 53A, a movable member contact portion 53B, and a plate spring attachment portion 53C. The rotation shaft portion 53A is configured to rotate about a rotation axis, which is partially shown in the drawings. The movable member contact portion 53B is configured to contact the movable member 51 when the movable member 51 is positioned at the first end P1. A plate spring (elastic member) 53D is attached to the plate spring attachment portion 53C. The plate spring (elastic member) 53D is in contact with the connecting portion 72B of the first flap 72. Thus, the first flap 72 and the first link 53 are connected via the plate spring 53D.

As shown in FIGS. 7 and 8, when the movable member 51 is positioned at a position other than the first position P1 (when the movable member 51 is at the second position P2 in this example), the first link 53 pushes up the first flap 72 via the plate spring 53D. In this condition, the path is switched to the first path by the first flap 72. As shown in FIGS. 9 and 10, when the movable member 51 moves and is disposed at the first position Pl at the first end, the movable member 51 is brought into contact with the movable member contact portion 53B to push up the movable member contact portion 53B, and the first link 53 rotates about the rotation shaft portion 53A. Then, the first link 53 pushes down the first flap 72 via the plate spring 53D. Thus, the path is switched to the second path by the first flap 72.

The second link 54 includes a rotation shaft portion 54A, a movable member contact portion 54B, and a plate spring attachment portion 54C. The rotation shaft portion 54A is configured to rotate about a rotation axis, which is partially shown in the drawings. The movable member contact portion 54B is configured to contact the movable member 51 when the movable member 51 is positioned at the second end P2. A plate spring (elastic member) 54D is attached to the plate spring attachment portion 54C. The plate spring (elastic member) 54D is in contact with the connecting portion 74B of the second flap 74. Thus, the second flap 74 and the second link 54 are connected via the plate spring 54D.

As shown in FIGS. 9 and 10, when the movable member 51 is positioned at a position other than the second position P2, the second link 54 pushes up the second flap 74 via the plate spring 54D. In this condition, the path is switched to the third path by the second flap 74. As shown in FIGS. 7 and 8, when the movable member 51 moves and is disposed at the second position P2 at the second end, the movable member 51 is brought into contact with the movable member contact portion 54B to push up the movable member contact portion 54B, and the second link 54 rotates about the rotation shaft portion 54A. Then, the second link 54 pushes down the second flap 74 via the plate spring 54D. Thus, the path is switched to the fourth path by the second flap 74.

According to the present embodiment, in the condition that the paper 201, 203 is passing through the second path due to the switch of the path to the second path (when the movable member 51 is at the first position P1), the first flap 72 allows the paper 201, 203 to pass through the second path even if the path is switched to the first path. In other words, when the paper is passing through the second path in a state shown in FIGS. 9 and 10 and the movable member 51 moves to the second position P2 to switch the third path to the fourth path by the second flap 74, the first flap 72 is switched to the first path as shown in FIG. 11. However, in this condition, the first flap 72 presses on the passing paper 201, 203 via the plate spring 53D with a spring force to allow the paper 201, 203 to continuously pass through the second path (the first flap 72, which rotates in a direction to prevent the paper from passing through the second path, is provided with a rotational force to contact the paper while allowing the paper to pass through the second path). If the first flap 72 has been switched to the first path before the paper passes through the second path, the paper will pass through the first path because the first flap 72 closes the second path. In this way, the single movable member 51 can switch the four paths, i.e., the first to fourth paths.

Figure 12:
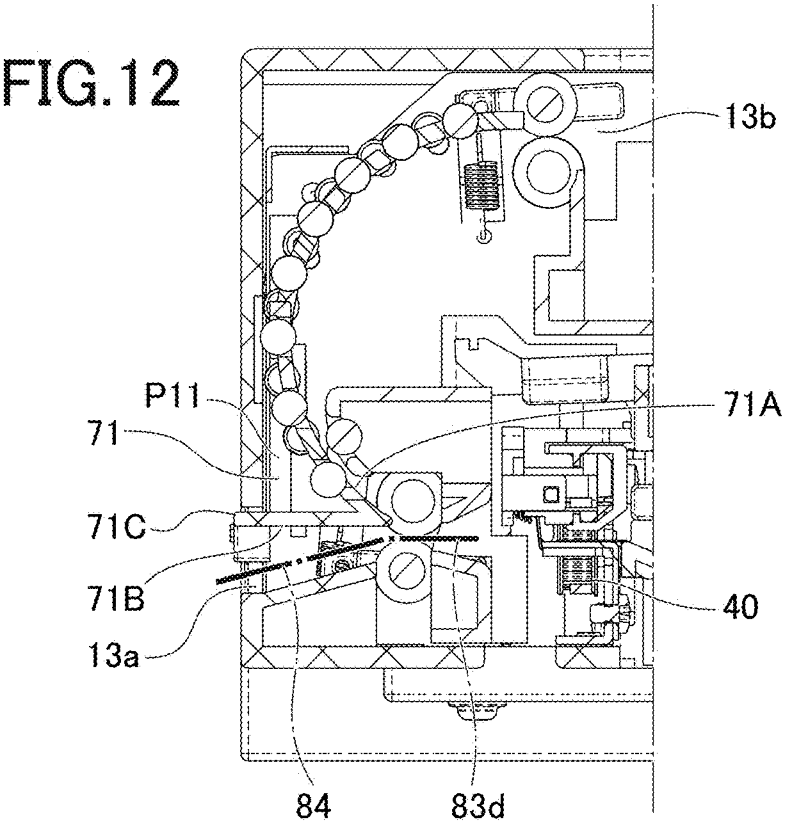
FIG. 12 is an enlarged sectional view showing a part of FIG. 2 for clarifying a discharge path switching mechanism section and showing a condition where a discharge path switching member is at a first position.
Figure 13:
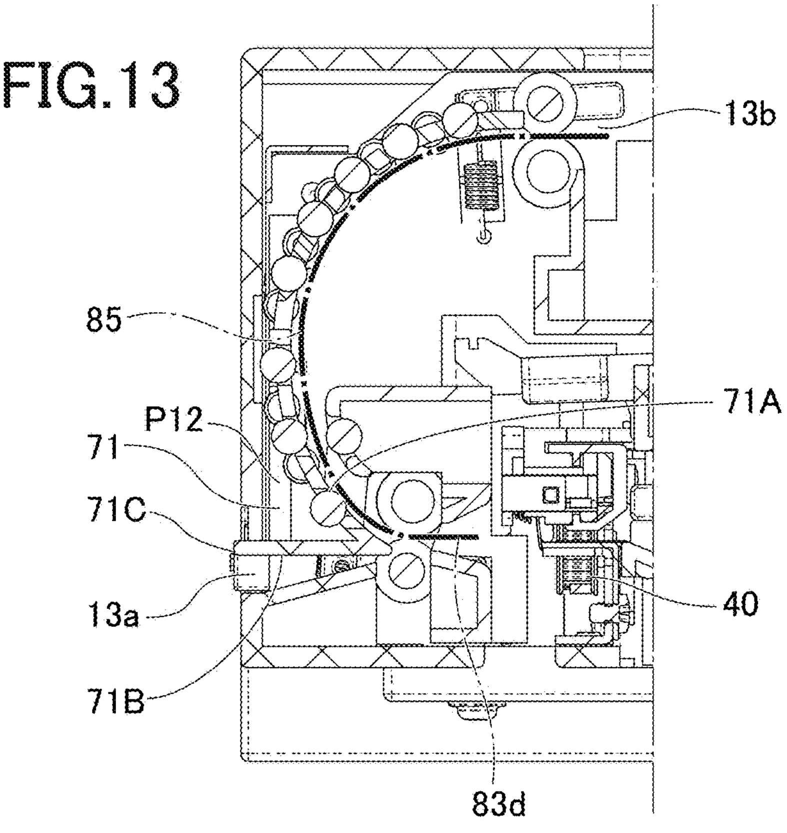
FIG. 13 is an enlarged sectional view showing a part of FIG. 2 for clarifying a discharge path switching mechanism section and showing a condition where the discharge path switching member is at a second position.

(Discharge path switching mechanism) FIGS. 12 and 13 are enlarged sectional views showing a part of FIG. 2 for clarifying a discharge path switching mechanism. In the present embodiment, as mentioned above, the printer includes the front outlet 13*a* which is the first outlet to discharge the paper 201, 203, and the upper outlet 13*b* which is the second outlet to discharge the paper 201, 203. The second outlet is different from the first outlet. The printer also includes a discharge path switching member 71 that switches the passages between the first discharge passage (front discharge path 84 described later), which communicates with the front outlet 13*a*, and the second discharge passage (upper discharge path 85 described later), which communicates with the upper outlet 13*b* to connect the transport passage (joined path 83*d*) with the first discharge passage or the second discharge passage.

As shown in FIG. 12, when the discharge path switching member 71 is at a first position P11 where the first discharge passage (front discharge path 84) is not blocked, the transport passage (joined path 83*d*) and the first discharge passage (front discharge path 84) are connected. Upon this, when a bottom wall 71B of the discharge path switching member is at the first position P11, it constitutes a part of the first discharge passage (front discharge path 84).

As shown in FIG. 13, when the discharge path switching member 71 is at a second position P12 where the first discharge passage (front discharge path 84) is blocked, an inner wall 71A of the discharge path switching member 71 constitutes a part of a connecting passage that connects the transport passage (joined path 83*d*) and the second discharge passage (upper discharge path 85). The inner wall 71A of the discharge path switching member 71 is curved such that, when an end of the paper 201, 203 comes into contact therewith, the paper 201, 203 transported through the transport passage (joined path 83*d*) in the front-rear direction L is guided in an upward direction L and smoothly discharged from the upper outlet 13*b*. In the present embodiment, the first position P11 and the second position P12 are aligned in the vertical direction H of the printer 100.

The discharge path switching member 71 includes an extended wall 71C that projects toward the front surface side of the printer 100 and that extends continuously to be flush with the bottom wall 71B. When switching the outlet of the paper 201, 203, a user pinches the extended wall 71C to move the discharge path switching member 71 between the first position P11 and the second position P12. The discharge path switching member 71 may be provided on a surface of the printer 100 other than the front surface, for example, on a side surface in a projecting manner.

The features and the advantageous effects of a printer including a discharge path switching mechanism are described.

(1) A printer including a first outlet that is configured to discharge a paper; a second outlet that is configured to discharge the paper, wherein the second outlet is different from the first outlet; and a discharge path switching member that is configured to switch a transport passage for transporting the paper to one of a first discharge passage communicating with the first outlet, and a second discharge passage communicating with the second outlet to connect the transport passage with one of the first and second discharge passages. When the discharge path switching member is at a first position where the first discharge passage is not blocked, the transport passage and the first discharge passage are connected. When the discharge path switching member is at a second position where the first discharge passage is blocked, an inner wall of the discharge path switching member constitutes a part of a connecting passage that connects the transport passage and the second discharge passage.

Therefore, the discharge path switching member can switch between the first and second discharge passages. The discharge path switching member constitutes a part of the connecting passage. Accordingly, it is not necessary to separately prepare a component that constitutes the passage, thereby reducing the number of components.

(2) In the printer according to (1), the first outlet is a front outlet that is configured to discharge the paper to the front surface side. The second outlet is an upper outlet that is provided above the first outlet and configured to discharge the paper to an upper side. The discharge path switching member is movable between the first position and the second position.

Therefore, a simple operation of moving the discharge path switching member upward or downward makes it possible to switch the paper discharging outlet between the front outlet and the upper outlet.

(3) In the printer according to (2), the inner wall of the discharge path switching member has a curved shape to guide the paper, which has been transported through the transport passage in the front-rear direction orthogonal to the vertical direction, in an upward direction when an end of the paper contacts the inner wall.

Therefore, the paper is bent along the curved shape to be smoothly discharged from the upper outlet.

(4) In the printer according to (1), when a bottom wall of the discharge path switching member is at the first position where the first discharge passage is not blocked, it constitutes a part of the first discharge passage.

The discharge path switching member constitutes a part of the connecting passage. Accordingly, it is not necessary to separately prepare a component that constitutes the path, thereby reducing the number of components.

(5) In the printer according to (4), the discharge path switching member includes an extended wall that projects toward the front surface side of the printer and extends continuously to be flush with the bottom wall.

Therefore, when switching the outlet of the paper, a user can pinch the extended wall to move the discharge path switching member between the first position and the second position. When discharging from the first discharge passage, the first discharge passage is opened. When discharging from the second discharge passage, the first discharge passage is closed. In this operation, it is possible to intuitively understand where the paper is discharged from. By such an easily understood operation, it is possible to switch the outlets of the paper.

(Transport Path) The transport path 80 is a path for transporting the paper 201, 203. First, a portion of the transport path 80 for transporting the sheet paper 201 is described.

As shown by a single-point chain line in FIGS. 2 and 3, the part of the transport path 80 where the sheet paper 201 is transported includes a feeding path 81, the printing path 82, the discharge path 83*a*, the de-curling treatment discharge path 83*b*, the discharge path 83*c*, the joined path 83*d*, the front discharge path 84, the upper discharge path 85, the printing upstream path 86, and a printing downstream path 87.

The feeding path 81 extends upward from the front end of the sheet paper storage 21, then extends to turn back rearward and downward in a space formed in front of the roll paper storage 22 and behind the front center cover 14. Then, the feeding path 81 extends below the roll paper storage 22 and above the sheet paper storage 21 toward the rear of the roll paper storage 22 and then extends to an upwardly raised position at the rear of the roll paper storage 22.

Following the feeding path 81, the printing path 82 extends upward at the rear of the roll paper storage 22 along the rear of the roll paper storage 22. Then, the printing path 82 extends forward and above the roll paper storage 22 to the front part above the roll paper storage 22. The printing portion 30 is disposed at the printing path 82.

Following the printing path 82, the discharge path 83*a* extends forward from the front part above the roll paper storage 22 along the front-rear direction L. The discharge path 83*a* is separated into the de-curling treatment discharge path 83*b* and the discharge path 83*c* by the de-curling switching flap (second flap) 74. The de-curling treatment discharge path 83*b* and the discharge path 83*c* join together on a downstream side to form the joined path 83*d*. The cutter 40 is disposed at the joined path 83*d*. The joined path 83*d* extends to a position that is forward of the cutter 40.

Following the joined path 83*d*, the front discharge path 84 extends forward to the front outlet 13*a*. Following the joined path 83*d*, the upper discharge path 85 extends upward and rearward in a curved manner.

Following the printing path 82, the printing upstream path 86 extends from the front part above the roll paper storage 22 toward below the roll paper storage 22 to a position just before reaching the feeding path 81. The printing upstream path 86 extends concentrically with the outer periphery of the roll paper storage 22.

At a separation point between the printing upstream path 86 and the discharge path 83, the printing discharge switching flap (first flap) 72 is provided. The printing discharge switching flap 72 is rotatably provided so that its tip is displaced upward or downward and rotates by the control of the controller of the printer 100 not shown in the drawings. In a condition shown in FIG. 2, the printing discharge switching flap 72 is in a condition where the tip is displaced downwardly within its displaceable range.

In the condition where the tip of the printing discharge switching flap 72 is displaced downwardly within the displaceable range, the paper 201 that has traveled forward in the printing path 82 is switched to travel to the discharge path 83. In the condition where the tip of the printing discharge switching flap 72 is displaced upwardly within the displaceable range, the paper 201 that has traveled forward in the printing path 82 is switched to travel to the printing upstream path 86.

The printing downstream path 87 follows the end of the printing path 82 on the side of the feeding path 81. The printing downstream path 87 extends from the rear to the front of the roll paper storage 22 below the roll paper storage 22 and the feeding path 81 and above the sheet paper storage 21. A tip on the front side of the printing downstream path 87 rises upwardly and is formed to smoothly join the feeding path 81 similarly rising upwardly.

Here, a reversing portion 90 that reverses the front and back sides of the paper 201 is described. The paper 201 is printed on its surface with which the ink ribbon 32 comes into contact in the printing path 82, that is, on its surface facing rearward in the front-rear direction L in FIGS. 2 and 3. The surface printed in the printing path 82 faces downward in the height direction H when the paper 201 is transported to the printing downstream path 87.

The paper 201 is transported forward in the printing downstream path 87 and then in the feeding path 81 rising upward. The printed surface of the paper 201 faces upward in the height direction H below the roll paper storage 22 when the paper 201 is transported in the feeding path 81.

Further, the paper 201 is transported rearward in the feeding path 81 and then in the printing path 82 rising upward. The printed surface of the paper 201 faces forward in the front-rear direction when the paper 201 is transported in the printing path 82. In other words, the paper 201 is turned over while transported in the feeding path 81 from the printing downstream path 87, and as a result, the front and back sides of the paper 201 are reversed. Therefore, the printing downstream path 87 and the feeding path 81 constitute the reversing portion 90 which reverses the front and back sides of the paper 201. The reversing portion 90 is a part of the transport path 80, and accordingly, it is provided in the internal drawer 60, similar to other parts of the transport path 80.

As shown in FIG. 3, the feeding path 81 includes a curved portion M1 that is convex upward and corresponds to at least a part of the reversing portion 90. The curved portion M1 is a portion that reverses the transport direction of the sheet paper 201, which is transported in the feeding path 81, from upward to downward. The curved portion M1 is formed in front of the roll paper storage 22 and overlaps with the roll paper storage 22 when it is viewed from the front (front in the front-rear direction L) of the printer 100 in the front-rear direction L. The curved portion M1 is formed, for example, to have a radius of curvature of 30 [mm].

If the radius of curvature of the curved portion M1 is less than 30 [mm], the smoothness of transport of the sheet paper 201 may be impaired. Accordingly, it is preferable that the curved portion M1 has a radius of curvature of 30 [mm] or greater. However, the radius of curvature of the curved portion M1 is not limited to 30 [mm] or greater. The radius of curvature of the curved portion M1 may be set at less than 30 [mm] depending on the thickness, property, etc. of the paper 201, 203 to be used.

Some sheet paper 201 is hardly impaired by the curved portion MI in terms of the transport smoothness, depending on the thickness or property of the paper. In this case, the sheet paper 201, which is hardly impaired in terms of the transport smoothness, can be selected and used as long as the radius of curvature of the curved portion M1 is 20 [mm] or greater.

A portion M2 of the feeding path 81 and the printing downstream path 87 passes below the roll paper storage 22 and corresponds to at least another part of the reversing portion 90. The portion M2 is formed below the roll paper storage 22 and overlaps with the roll paper storage 22 when it is viewed downward in the height direction H from above.

On the other hand, the reversing portion 90 does not overlap at all with the roll paper storage 22 when it is viewed from one side to the other side of the printer 100 in the width direction W.

Next, a part of the transport path 80 for transporting the paper 203 unwound from the roll paper 202 is described. In addition to the part where the sheet paper 201 is transported, the part of the transport path 80, where the paper 203 is unwound from the roll paper 202 is transported, includes a roll paper feeding path 89 as shown by a single-point chain line in FIGS. 2 and 3.

The roll paper feeding path 89 extends rearward from substantially the bottom of the roll paper 202 stored in the roll paper storage 22 to an upwardly rising position at the rear of the roll paper storage 22.

At a part where the feeding path 81 and the roll paper feeding path 89 join, a feeding switching flap 73 is provided. The feeding switching flap 73 is rotatably provided so that its tip can be displaced forward or rearward. In a condition shown in FIG. 2, the tip of the feeding switching flap 73 is biased toward the front side within its displaceable range by a spring not shown in the drawings.

In a condition where the tip is biased toward the front side within the displaceable range of the feeding switching flap 73, the paper 201 transported through the feeding path 81 is switched to travel to the printing path 82, and the paper 201 transported from the printing path 82 is switched to travel to the printing downstream path 87.

On the other hand, in a condition where the tip is biased toward the front side in the displaceable range of the feeding switching flap 73, when the paper 203 unwound from the roll paper 202 and transported through the roll paper feeding path 89 travels toward the printing path 82, the paper 203 presses the feeding switching flap 73 against the biasing force of the spring toward the rear side in the displaceable range of the tip, thereby traveling the printing path 82.

When the paper 203 unwound from the roll paper 202 is printed at the printing portion 30 of the printing path 82, the paper 203 remains unseparated from the roll paper 202. Therefore, the feeding switching flap 73 remains pressed toward the rear side in the displaceable range of the tip by a part of the paper 203 passing through the roll paper feeding path 89.

The feeding switching flap 73 may also be rotated by the control of the controller (not shown in the drawings) of the printer 100.

(Transport Portion) The transport portion 70 includes a sheet paper delivery roller 77*a*, a feeding roller 77*b*, a reversing roller 77*c*, a gripping roller 77*d*, a first sending roller 77*e*, a first discharge roller 77*f*, a second discharge roller 77*g*, and a roll paper delivery roller 77*i*.

Each of these transport rollers 77*a* to 77*i* contacts the front or back surface of at least one of the sheet paper 201 or the paper 203, and rotates by the control of the controller (not shown in the drawings) of the printer 100, thereby transporting the paper 201, 203 along the transport path 80.

The sheet paper delivery roller 77*a* is disposed above the vicinity of the front end of the sheet paper storage 21. The sheet paper delivery roller 77*a* contacts the uppermost sheet paper 201 among the paper 201 stored in the sheet paper storage 21 and rotates to deliver the sheet paper 201 to the feeding path 81. The sheet paper delivery roller 77*a* can rotate in a direction opposite to the delivery direction so that the sheet paper 201 delivered to the feeding path 81 is pulled back into the sheet paper storage 21.

The feeding roller 77*b* is disposed at a position of the feeding path 81 that is close to the sheet paper delivery roller 77*a*. The feeding roller 77*b* contacts the sheet paper 20 delivered to the feeding path 81 by the sheet paper delivery roller 77*a* and transports the sheet paper 201 upward along the feeding path 81. The feeding roller 77*b* can also rotate in a direction opposite to the transport direction, thereby pulling the sheet paper 201 back.

The reversing roller 77*c*, the gripping roller 77*d*, the first sending roller 77*e*, the first discharge roller 77*f*, the second discharge roller 77*g*, and a second sending roller 77*h*, which are described later, can also rotate in directions opposite to their transport directions, similar to the feeding roller 77*b*, thereby pulling the sheet paper 201 back.

The reversing roller 77*c* is disposed in a part of the feeding path 81 above the feeding roller 77*b*. The reversing roller 77*c* contacts the sheet paper 201 traveled in the feeding path 81 by the feeding roller 77*b* and transports the sheet paper 201 along the feeding path toward the printing path 82.

The gripping roller 77*d* is disposed in a part of the printing path 82 that is on the side closer to the feeding path 81 and at a position ahead of the tip of the feeding switching flap 73. The gripping roller 77*d* contacts the sheet paper 201 transported to the printing path 82 and transports the sheet paper 201 through the printing portion 30 toward the discharge path 83*a* or the printing upstream path 86. At this time, the feeding switching flap 73 is switched forward, thereby allowing the sheet paper 201 transported through the feeding path to be transported to the printing path 82.

The first sending roller 77*e* is disposed in a part of the joined path 83*d* closer to the printing path 82 than the cutter 40. The first sending roller 77*e* contacts the sheet paper 201 transported to the joined path 83*d* and transports the sheet paper 201 to the first discharge roller 77*f* through the cutter 40.

The first discharge roller 77*f* is disposed near the end of the joined path 83*d* that is on the side farther from the printing path 82 and at a position before the discharge path switching member 71. The first discharge roller 77*f* contacts the sheet paper 201 transported to the joined path 83*d* and transports the sheet paper 201 to the front discharge path 84 or the upper discharge path 85 depending on the position of the discharge path switching member 71.

The second discharge roller 77*g* is disposed near the upper outlet 13*b* of the upper discharge path 85. The second discharge roller 77*g* contacts the sheet paper 201 transported to the upper discharge path 85 and discharges the sheet paper 201 from the upper outlet 13*b* into the recessed portion 12*a* which functions as a stacker of the top cover 12.

The roll paper delivery roller 77*i* is disposed in a part of the roll paper feeding path 89 on the side closer to the printing path 82 and at a position ahead of the tip of the feeding switching flap 73. The roll paper delivery roller 77*i* contacts the paper 203 wound around the outermost circumference of the roll paper 202 stored in the roll paper storage 22 and rotates to deliver the paper 203 toward the gripping roller 77*d*.

The roll paper delivery roller 77*i* also can rotate in a direction opposite to the delivery direction so that the paper 203 delivered toward the gripping roller 77*d* is rewound around the roll paper 202 of the roll paper storage 22.

(Operation) The operation of the printer 100 with the configuration is described. Firstly, the printing operation on the sheet paper 201 is described.

Figure 14:
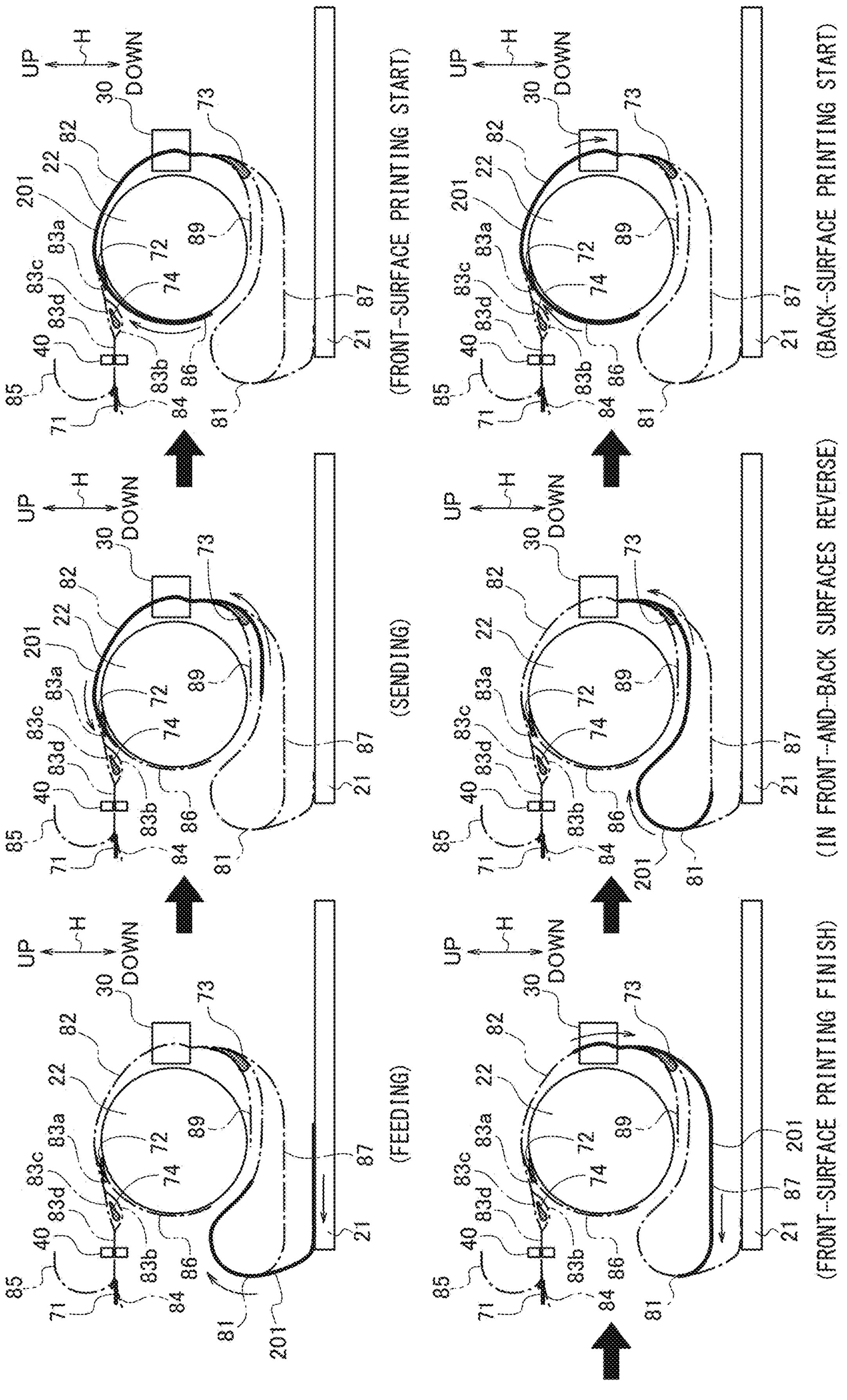
FIG. 14 is a simplified sectional view (No. 1) corresponding to FIG. 3, schematically showing the movement of a sheet paper when the printer conducts a printing on both front and back surfaces of the sheet paper.
Figure 15:
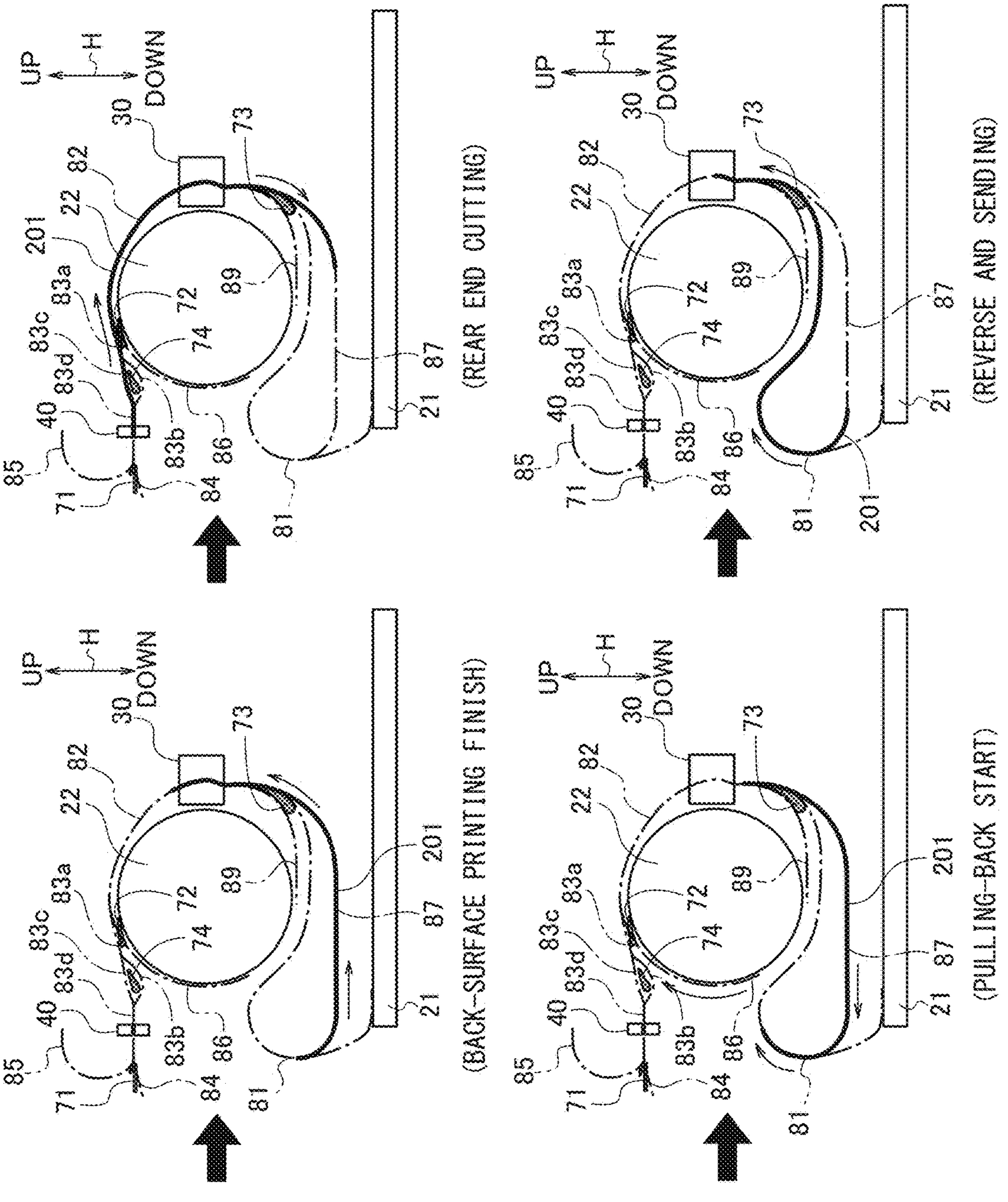
FIG. 15 is a simplified sectional view (No. 2) corresponding to FIG. 3, schematically showing the movement of the sheet paper when the printer conducts the printing on both front and back surfaces of the sheet paper.
Figure 16:
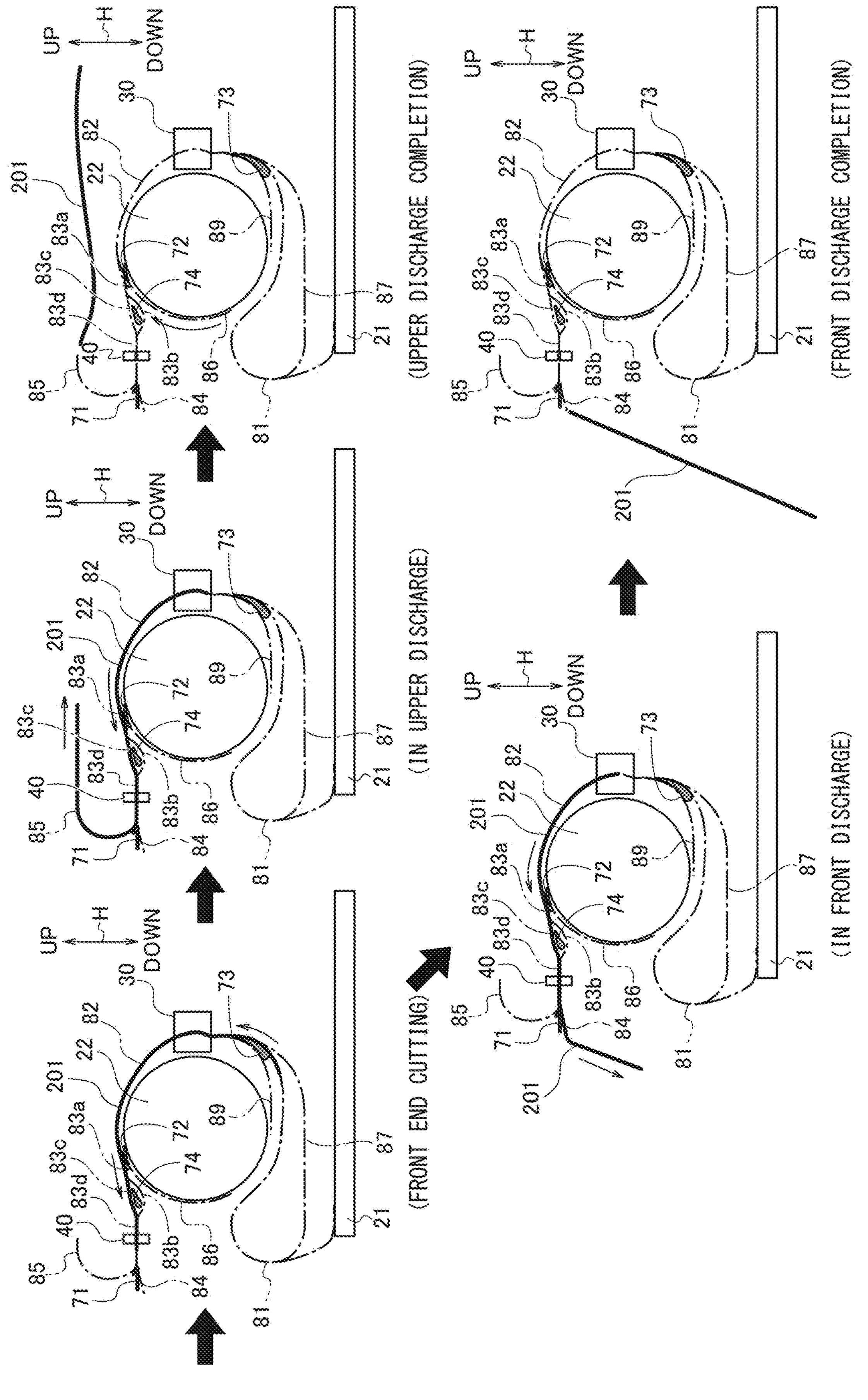
FIG. 16 is a simplified sectional view (No. 3) corresponding to FIG. 3, schematically showing the movement of the sheet paper when the printer conducts the printing on both front and back surfaces of the sheet paper.
Figure 17:
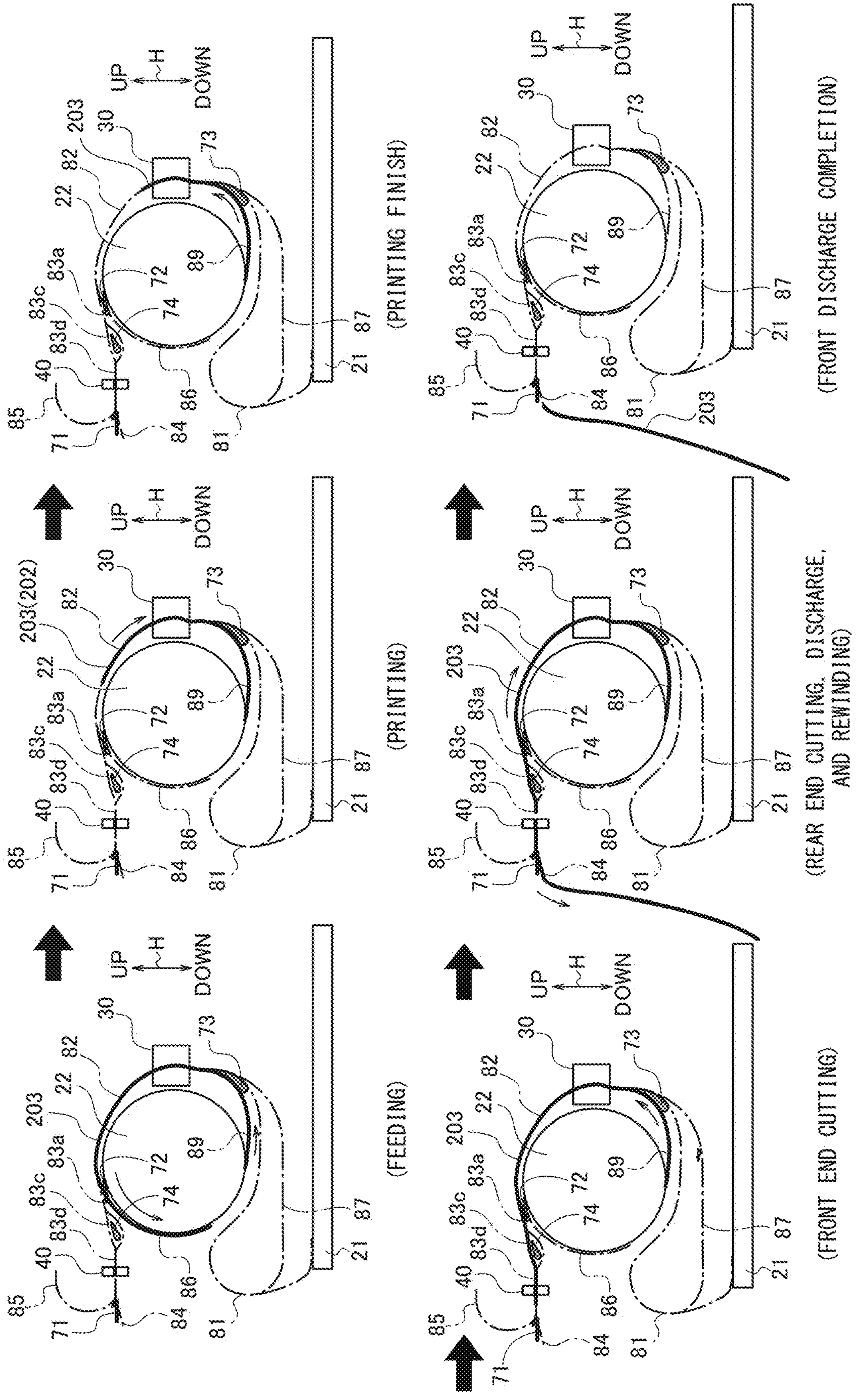
FIG. 17 is a simplified sectional view corresponding to FIG. 3, schematically showing the movement of a paper when the printer conducts printing on the roll paper.

FIGS. 14, 15, and 16 are simplified sectional views corresponding to FIG. 3, schematically showing the movement of the sheet paper 201 when the printer 100 conducts printing on both the front and back surfaces of the sheet paper 201. FIG. 17 is a simplified sectional view corresponding to FIG. 3, schematically showing the movement of the paper 203 when the printer 100 conducts printing on the roll paper 202.

(Operation on Sheet Paper) The operation of the printer for printing on the sheet paper 201 and discharging the sheet paper 201 is described with reference to FIGS. 14 to 16.

Firstly, the sheet paper delivery roller 77*a* (see FIG. 2, the same applies hereinafter) rotates to deliver the uppermost sheet paper 201 from the stack of the sheet paper 201 stored in the sheet paper storage 21. Further, as shown in the upper left of FIG. 14, the rotations of the feeding roller 77*b* and the reversing roller 77*c* transport the sheet paper 201 in the feeding path 81 in the directions shown with the arrows.

As shown in the upper center of FIG. 14, the sheet paper 201 is guided to the printing path 82 by switching the feeding switching flap 73 and travels in the printing path 82 by the rotation of the gripping roller 77*d*. Then, as shown in the upper right of FIG. 14, the sheet paper 201 is guided to the printing upstream path (first path) 86 by switching the printing discharge switching flap (first flap) 72.

When the sheet paper 201 travels to the end of the printing upstream path 86, the gripping roller 77*d* reverses (its rotational direction becomes opposite) and passes through the printing portion 30. As shown in the lower left of FIG. 14, the sheet paper 201 is printed on the front surface while passing through the printing portion 30 and moves to the printing downstream path 87.

When color printing is performed on the front surface of the sheet paper 201 and overcoating is additionally performed with the ink ribbon 32 by replacing the color of the ink ribbon 32, the transport and the printing are repeated between the condition of the upper right and that of the lower left of FIG. 14 by switching the rotational direction of the gripping roller 77*d*. Then, the color printing and overcoating treatment of the front surface are completed.

When the printing on the front surface of the sheet paper 201 is completed, as shown in the lower left and the lower center of FIG. 14, the sheet paper 201 is transported to the feeding path 81 by the rotation of the reversing roller 77*c* and the front and back surfaces of the sheet paper 201 are reversed by passing the reversing portion 90, which consists of the printing downstream path 87 and the feeding path 81. In other words, the sheet paper 201 is turned over when passing through the reversing portion 90, and the surface to be printed by the printing portion 30 in the printing path 82 is reversed.

As shown in the lower center and the lower right of FIG. 14, the sheet paper 201 reversed by the reversing portion 90 is transported to the end of the printing upstream path 86 by the rotation of the gripping roller 77*d* which has been reversed again.

When the sheet paper 201 travels to the end of the printing upstream path 86, the gripping roller 77*d* reverses again. Accordingly, as shown in the upper left of FIG. 15, the sheet paper 201 passes through the printing portion 30 and travels to the printing downstream path 87 while being printed on the back surface of the sheet paper 201.

When color printing is performed on the back surface of the sheet paper 201 and overcoating is additionally performed with the ink ribbon 32 by replacing the color of the ink ribbon 32, the transport is repeated between the condition of the lower right of FIG. 14 and that of the upper left of FIG. 15. Then, the color printing and overcoating treatment of the back surface are completed.

When the printing on the back surface of the sheet paper 201 is completed, the gripping roller 77*d* is reversed again. Accordingly, the sheet paper 201 passes through the printing path 82 as shown in the upper center of FIG. 15 from the condition shown in the upper left of FIG. 15. Then, the cutter 40 (movable member 51) moves to the first position P1, and the printing discharge switching flap (first flap) 72 is switched to transport the sheet paper 201 to the discharge path (second path) 83*a*.

Then, the cutter 40 (movable member 51) moves to the second position P2, and the de-curling switching flap (second flap) 74 is switched so that the sheet paper 201 is transported to the joined path 83*d* via the discharge path (fourth path) 83*c* in the condition of FIG. 11.

In the joined path 83*d*, the sheet paper 201 travels to the cutter 40 by the rotation of the first sending roller 77*e*, and the unnecessary part at the rear end of the sheet paper 201 is cut by the cutter 40 in the condition shown by the upper right of FIG. 15. The cut-off unnecessary part falls into the trash box 16 (see FIG. 2), which is disposed below the cutter 40, and is stored in the trash box 16.

The sheet paper 201 whose unnecessary rear-end part has been cut off is transported toward the printing path 82 through the joined path 83*d*, the discharge path 83*c*, and the discharge path 83*a* by the reversal of the first sending roller 77*e*. Further, the gripping roller 77*d* reverses again, and accordingly, the sheet paper 201 passes through the printing path 82 and is pulled back to the printing downstream path 87 as shown in the lower left of the same drawing.

Then, as shown in the lower right of the same drawing, the sheet paper 201 is transported to the printing path 82 by passing through the reversing portion 90 which consists of the printing downstream path 87 and the feeding path 81. In the printing path 82, the gripping roller 77*d* reverses again, thereby transporting the sheet paper 201 to the discharge path 83 as shown in the upper left of FIG. 9. The sheet paper 201 is transported to the cutter 40 by the rotation of the first sending roller 77*e* in the discharge path 83.

Then, in the condition shown by the upper left of FIG. 16, the unnecessary part at the front end of the sheet paper 201 is cut off by the cutter 40. The cut-off unnecessary part falls into the trash box 16 (see FIG. 2), which is disposed below the cutter 40, and is stored inside the trash box 16.

The sheet paper 201 whose unnecessary front end part has been cut off passes through the cutter 40 and travels forward by the rotation of the first sending roller 77*e*. The sheet paper 201 traveled ahead of the cutter 40 is transported by the rotation of the first discharge roller 77*f*. In a condition that the discharge path switching member 71 has been switched to the lower side at the separation point, as shown in the upper center of the same drawing, the sheet paper is guided to the upper discharge path 85, and, as shown in the upper right of the same drawing, the sheet paper 201 is discharged from the upper outlet 13*b* by the rotation of the second discharge roller 77*g* which is located close to the upper outlet 13*b*.

On the other hand, in a condition that the discharge path switching member 71 has been switched to the upper side at the separation point, as shown in the lower left of the same drawing, the sheet paper 201 is guided to the front discharge path 84, and, as shown in the lower right of the same drawing, the sheet paper 201 is discharged from the front outlet 13*a*.

(Operation on Roll Paper) Next, the operation of conducting printing on the roll paper 202 and then discharging the same by the printer 100 is described with reference to FIG. 17.

Firstly, the roll paper delivery roller 77*i* (see FIG. 2, the same applies hereinafter) rotates, and the rotation of the roll paper delivery roller 77*i* unwinds the paper 203 from the outermost circumference of the roll paper 202 stored in the roll paper storage 22.

As shown in the upper left of FIG. 17, the unwound paper 203 is transported in the printing path 82 and the printing upstream path (first path) 86 by switching the feeding switching flap 73 to the rear side and the printing discharge switching flap 72 to the upper side as well as by rotating the roll paper delivery roller 77*i* and the gripping roller 77*d*, and the unwound paper 203 is delivered by a length necessary for the printing as shown in the upper center of FIG. 17.

Next, the delivered paper 203 is pulled back to the printing path 82 and the roll paper feeding path 89 by reversing the gripping roller 77*d* and the roll paper delivery roller 77*i*. As shown in the upper center of FIG. 17, the printing portion 30 prints on the paper 203 while the paper 203 passes through the printing path 82.

When color printing is performed on the paper 203 and overcoating is additionally performed with the ink ribbon 32 by replacing the color of the ink ribbon 32, the transport toward the outlet and the printing in the reverse transport are repeated similar to the case of the sheet paper 201. Then, the color printing and overcoating treatment are completed.

As shown in the upper right of the same drawing, when the printing on the paper 203 is completed, the roll paper feeding roller 77*i* and the gripping roller 77*d* are reversed. As a result, the paper 203 passes through the roll paper feeding path 89 and the printing path 82. The cutter 40 (movable member 51) moves to the first position P1 and the printing discharge switching flap (first flap) 72 is switched to the lower side to transport the paper 203 to the discharge path (second path) 83*a*.

Then, the cutter 40 (movable member 51) stays at the first position P1, and the roll paper 203 is transported to the joined path 83*d* through the de-curling treatment discharge path (third path) 83*b*.

As shown in the lower left of FIG. 17, in the joined path 83*d*, the paper 203 passes the cutter 40 by the rotation of the second sending roller 77*e*. The cutter 40 cuts the unnecessary part at the front end in the transport direction of the paper 203 if necessary. The cut-off unnecessary part of the paper 203 is stored in the trash box 16.

Then, the printed paper 203 whose unnecessary part has been cut off is transported to the front outlet 13*a* through the front discharge path 84 by the switch of the discharge path switching member 71 to the upper side at the separation point and the rotation of the first discharge roller 77*f*.

As shown in the lower center of FIG. 17, when the printed region of the paper 203 has passed the cutter 40, the cutter cuts the paper 203 to cut off the paper 203 including the printed region from the paper 203 connected to the roll paper 202.

The paper 203 on the side connected to the roll paper 202 is rewound around the roll paper 202 by reversing the second sending roller 77*e*, the gripping roller 77*d*, and the roll paper feeding roller 77*i*. The paper 203 including the printed region and separated from the roll paper 202 is discharged from the front outlet 13*a*, as shown in the lower right of the same drawing.

The printed paper 203 may be discharged from the upper outlet 13*b* through the upper discharge path 85 by switching the discharge path switching member 71 to the lower side at the separation point.

(Advantageous Effects) As described above, the printer 100 of the present embodiment can switch the first flap and the second flap as well as the four paths in which the paper travels with the single movable member 51. Further, the cutter 40 provided in the printer for cutting the paper also functions as the movable member 51, thereby reducing the number of components.

In a condition that the paper is passing through the second path due to switching to the second path, the first flap 72 allows the paper to pass through the second path although the path is switched to the first path. In this way, it is possible to switch the paths with the single movable member 51 even if the paper passes over both the first flap 72 and the second flap 74.

The embodiments of the present disclosure have been described in detail, but the present disclosure is not limited to these embodiments. It is possible to modify them within the scope of the technical concept of the present disclosure.

For example, the printer 100 of the present embodiment is a dye-sublimation thermal printer, but the printer according to the present disclosure is not limited to the dye-sublimation thermal printer. It may be another printing-type printer other than the dye-sublimation thermal printer.

The printer 100 of the present embodiment has shown an exemplary to include the switching mechanism that switches the two flaps of the first flap and the second flap. However, the printer according to the present disclosure can also have a configuration to perform switching three or more flaps with a single movable member. In other words, the printer according to the present disclosure can have a configuration to perform switching a plurality of flaps by a movable member.

In the present embodiment, the second flap functions as the de-curling switching flap, but it may perform switching between other paths (for example, between the printing path and the discharge path, and/or between the front discharge path and the upper discharge path).

The first and second positions in the width direction are not limited to the left and right ends in the width direction of the paper, but may be arranged side by side at one of the ends or may not be at the end or ends in the width direction of the paper as long as it does not affect the paper cutting operation.

The invention claimed is:

1. A printer comprising:

a first flap that is configured to switch a path for a paper transported in a transport direction, to one of a first path and a second path;

a second flap that is provided downstream of the first flap in the transport direction, the second flap configured to switch the path for the paper transported through the second path, to one of a third path and a fourth path;

a movable member that is configured to move in a width direction of the paper, the width direction being orthogonal to the transport direction; and a switching mechanism that is configured to switch the first flap between a state in which the movable member is disposed at a first position in the width direction and a state in which the movable member is disposed at a position other than the first position in the width direction, and to switch the second flap between a state in which the movable member is disposed at a second position in the width direction and a state in which the movable member is disposed at a position other than the second position in the width direction.

2. The printer according to claim 1, wherein the switching mechanism is configured to apply a rotational force to the first flap which rotates in a direction to prevent the paper from passing through the second path to contact the paper and allow the paper to pass through the second path when the paper is passing through the second path after the path is switched to the second path, even if the movable member moves to a position at which the path for the paper is switched to the first path.

3. The printer according to claim 2, wherein the switching mechanism comprises a first link that is configured to switch the first flap when the movable member is disposed at the first position in the width direction, wherein the first flap is connected to the first link via an elastic member, and wherein the elastic member has an elastic force that transmits the rotational force to the first flap, allowing the paper to pass through the second path.

4. The printer according to claim 1, wherein the first path is a printing path that is selected when printing is performed on the paper, and the second path is a travelling path that is selected when the paper is directed toward an outlet.

5. The printer according to claim 4, wherein the third path is a de-curling treatment discharge path that is configured to discharge the paper after performing a de-curling treatment to correct a curl of the paper, and the fourth path is a discharge path that is configured to direct the paper, which has passed through the second path, toward the outlet.

6. The printer according to claim 5, wherein the third path and the fourth path join on a downstream side in the transport direction to form a joined path.

7. The printer according to claim 1, wherein the movable member is provided downstream of the second flap in the transport direction and comprises a movable blade of a cutter that is configured to cut the paper by moving in the width direction, and wherein the first and second positions are provided respectively on first and second sides in the width direction of the paper, or the first and second positions are provided side by side on only one of the first and second sides in the width direction of the paper.

* * * * *